(12) United States Patent
Seok

(10) Patent No.: US 11,494,307 B2
(45) Date of Patent: Nov. 8, 2022

(54) HOST, STORAGE DEVICE, AND COMPUTING SYSTEM HAVING THE SAME

(71) Applicant: SK hynix Inc., Gyeonggi-do (KR)

(72) Inventor: Ji Hoon Seok, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/939,845

(22) Filed: Jul. 27, 2020

(65) Prior Publication Data

US 2021/0263852 A1 Aug. 26, 2021

(30) Foreign Application Priority Data

Feb. 21, 2020 (KR) .................. 10-2020-0021662

(51) Int. Cl.
| | | |
|---|---|---|
| *G06F 12/08* | (2016.01) | |
| *G06F 12/0873* | (2016.01) | |
| *G06F 12/0882* | (2016.01) | |
| *G06F 12/02* | (2006.01) | |
| *G06F 12/0891* | (2016.01) | |

(52) U.S. Cl.
CPC ...... *G06F 12/0873* (2013.01); *G06F 12/0246* (2013.01); *G06F 12/0882* (2013.01); *G06F 12/0891* (2013.01); *G06F 2212/7201* (2013.01)

(58) Field of Classification Search
CPC ............. G06F 12/0246; G06F 12/0891; G06F 2212/7201; G06F 12/0873; G06F 12/0882
USPC ................................................ 711/154
See application file for complete search history.

(56) References Cited

U.S. PATENT DOCUMENTS

| | | | | |
|---|---|---|---|---|
| 9,244,858 B1* | 1/2016 | Hu | ...... | G06F 12/1072 |
| 10,871,907 B2* | 12/2020 | Palmer | ...... | G06F 3/0679 |
| 2020/0394131 A1* | 12/2020 | Lin | ...... | G06F 3/0608 |

FOREIGN PATENT DOCUMENTS

| | | |
|---|---|---|
| KR | 10-2017-0081118 | 7/2017 |
| KR | 10-2020-0022179 | 3/2020 |

* cited by examiner

*Primary Examiner* — Hua J Song
(74) *Attorney, Agent, or Firm* — IP & T Group LLP

(57) ABSTRACT

A computing system includes a host and a storage device. The host includes a host memory, and the storage device includes a processor, a semiconductor memory device and a device memory which caches mapping information of the semiconductor memory device. In operation, the processor transmits to the host read data and mapping table entry information of a logical address region corresponding to the read data in response to a read request. The mapping table entry information is transmitted to the host based on features of the logical address region. Additionally, the host may transmit a read buffer request corresponding to the mapping table entry information to the storage device, and the storage device may transmit mapping information corresponding to the read buffer request to the host, which then stores the mapping information in the host memory.

20 Claims, 22 Drawing Sheets

100
HOST, STORAGE DEVICE, AND COMPUTING SYSTEM HAVING THE SAME

CROSS-REFERENCE TO RELATED APPLICATION

The present application claims priority under 35 U.S.C. § 119(a) to Korean patent application number 10-2020-0021662, filed on Feb. 21, 2020, which is incorporated herein by reference in its entirety.

BACKGROUND

Field of Invention

Various embodiments of the present disclosure relate to an electronic device, and more particularly, to a host, a storage device, and a computing system having the host and the storage device.

Description of Related Art

A variety of semiconductor memory devices have been developed. One type of semiconductor memory device has a two-dimensional (2D) structure, in which strings are horizontally arranged on a semiconductor substrate. Another type of semiconductor memory device has a three-dimensional (3D) structure, in which strings of memory cells are vertically stacked on a semiconductor substrate.

Semiconductor memory devices having a 2D structure are steadily reaching their physical scaling limit (e.g., degree of integration). As a result, semiconductor manufacturers are producing 3D semiconductor memory devices in greater quantities in order to satisfy the storage requirements of their intended applications. These 3D semiconductor memory devices include a controller that controls operations associated with storing and retrieving data in response to requests from a host.

SUMMARY

Various embodiments of the present disclosure are directed to a host, a storage device, and a computing system having the host and the storage device, which can improve read performance.

An embodiment of the present disclosure may provide for a computing system. The computing system may include a host and a storage device. The host includes a host memory. The storage device includes a processor, a semiconductor memory device configured to have a plurality of memory blocks and a device memory configured to cache mapping information of the semiconductor memory device. The processor is configured to transmit read data and mapping table entry information of a logical address region corresponding to the read data to the host in response to a read request from the host. The storage device transmits the mapping table entry information to the host based on features of the logical address region. The host is configured to transmit a read buffer request corresponding to the mapping table entry information to the storage device. The storage device is configured to transmit mapping information corresponding to the read buffer request to the host. The host is configured to store the mapping information in the host memory.

An embodiment of the present disclosure may provide for a storage device. The storage device may include a semiconductor memory device and a controller. The semiconductor memory device includes a plurality of memory blocks. The controller is configured to control an operation of the semiconductor memory device. The controller is configured to, when a read request for user data is received from an external host, and valid mapping information is received together with the read request, generate a read command to control the semiconductor memory device so that the user data is read based on the mapping information. Further, the controller is configured to compare a read count value of a logical address region corresponding to the read request with a threshold value and generate mapping table entry information to recommend that mapping information corresponding to the logical address region be transmitted to the host when the read count value is greater than the threshold value. The threshold value is determined based on features of the logical address region corresponding to the read request.

An embodiment of the present disclosure may provide for a method of operating a storage device. The method may include receiving a read request from the host, referring to a read count value of a logical address region corresponding to the read request, calculating a threshold value based on features of the logical address region corresponding to the read request, comparing the read count value with the threshold value, and generating mapping table entry information to recommend that mapping information corresponding to the logical address region be transmitted to the host, when the read count value is greater than the threshold value.

An embodiment of the present disclosure may provide for a storage device including a storage area, a memory and a controller. The storage area may be configured to store data. The memory may be configured to store a mapping table indicating a correspondence between logical addresses and physical addresses of the storage area. The controller may be configured to control one or more storage operations for the storage area. The controller may be configured to determine that an internal operation is to be performed for data in the storage area within a set future time window and to delay transmission of entry information in the mapping table to a host in response to a read request. The controller may be configured to delay transmission of information in the mapping table to the host until after the internal operation has been performed.

DETAILED DESCRIPTION

Specific structural or functional descriptions in the embodiments of the present disclosure introduced in this specification or application are shown as examples to describe embodiments according to the concept of the present disclosure. The embodiments according to the concept of the present disclosure may be practiced in various forms, and should not be construed as being limited to the embodiments described in the specification or application.

Figure 1:
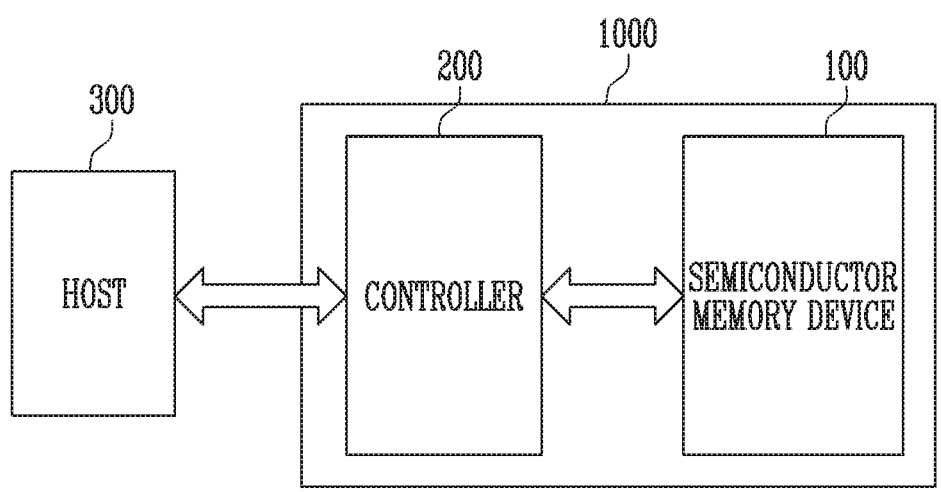
FIG. 1 is a block diagram illustrating a storage device having a controller according to an embodiment of the present disclosure.

FIG. 1 is a block diagram illustrating a storage device including a controller according to an embodiment of the present disclosure.

Referring to FIG. 1, a storage device 1000 includes a semiconductor memory device 100 and a controller 200. Further, the storage device 1000 communicates with a host 300. The controller 200 controls the overall operation of the semiconductor memory device 100. Also, the controller 200 controls the operation of the semiconductor memory device 100 in response to a command from the host 300.

The semiconductor memory device 100 is operated under control of the controller 200. The semiconductor memory device 100 includes a memory cell array having a plurality of memory blocks. In an embodiment, the semiconductor memory device 100 may be a flash memory device. The semiconductor memory device 100 may be a different type of memory in another embodiment.

The controller 200 may receive various types of requests including, but not limited to, a data write request, a data read request or an erase request from the host, and may control the semiconductor memory device 100 in response to the received request. For example, the controller 200 may generate commands for controlling operation of the semiconductor memory device 100, and may transmit the commands to the semiconductor memory device 100.

The semiconductor memory device 100 may receive the commands and corresponding addresses from the controller 200, and may access one or more areas of the memory cell array selected by the addresses. For example, the semiconductor memory device 100 may perform an internal operation corresponding to a command on an area selected by a specified address.

In one embodiment, the semiconductor memory device 100 may perform a program operation, a read operation, and an erase operation. During a program operation, the semiconductor memory device 100 may program data to an area selected by a specified address. During a read operation, the semiconductor memory device 100 may read data from an area selected by a specified address. During an erase operation, the semiconductor memory device 100 may erase data stored in an area selected by a specified address.

The host 300 may include various types of electronic devices including, for example, portable electronic devices such as a mobile phone, an MP3 player and a laptop computer, or electronic devices such as a desktop computer, a game console, a TV and projector or other types of wired or wireless electronic devices. Also, the host 300 may include at least one operating system (OS), which manages and controls the overall function and operation of the host 300 and provides interaction between a user who uses a computing system or the storage device 1000 and the host 300. Here, the operating system may support functions and operations corresponding to a usage purpose and/or a use intended by the user. In one embodiment, the functions and operations may be classified into, for example, a normal operating system and a mobile operating system according to the mobility of the host 300. The normal operating system may be classified into a personal operating system and a business-oriented operating system according to the operating system execution environment of the user. For example, the personal operating system may be a system specialized to support a service provision function for a normal user and, for example, may include Windows, Chrome, etc. The business-oriented operating system may be a system specialized to secure and support high performance and, for example, may include Windows Server, Linux, Unix, etc. Furthermore, the mobile operating system may be a system specialized to support a mobility service provision function and a system power-saving function for users and, for example, may include Android, iOS, Windows mobile, etc.

The host 300 may include a plurality of operating systems, and may run the operating systems so as to perform an operation with the storage device 1000 corresponding to a user request. For example, the host 300 may transmit a plurality of commands corresponding to the user request to the storage device 1000, and thus the storage device 1000 may perform operations corresponding to the commands, that is, operations corresponding to the user request. In relation to the control of the storage device 1000, the host 300 may include a file system configured in an operating system (OS) or configured separately from the operating system (OS).

Figure 2:
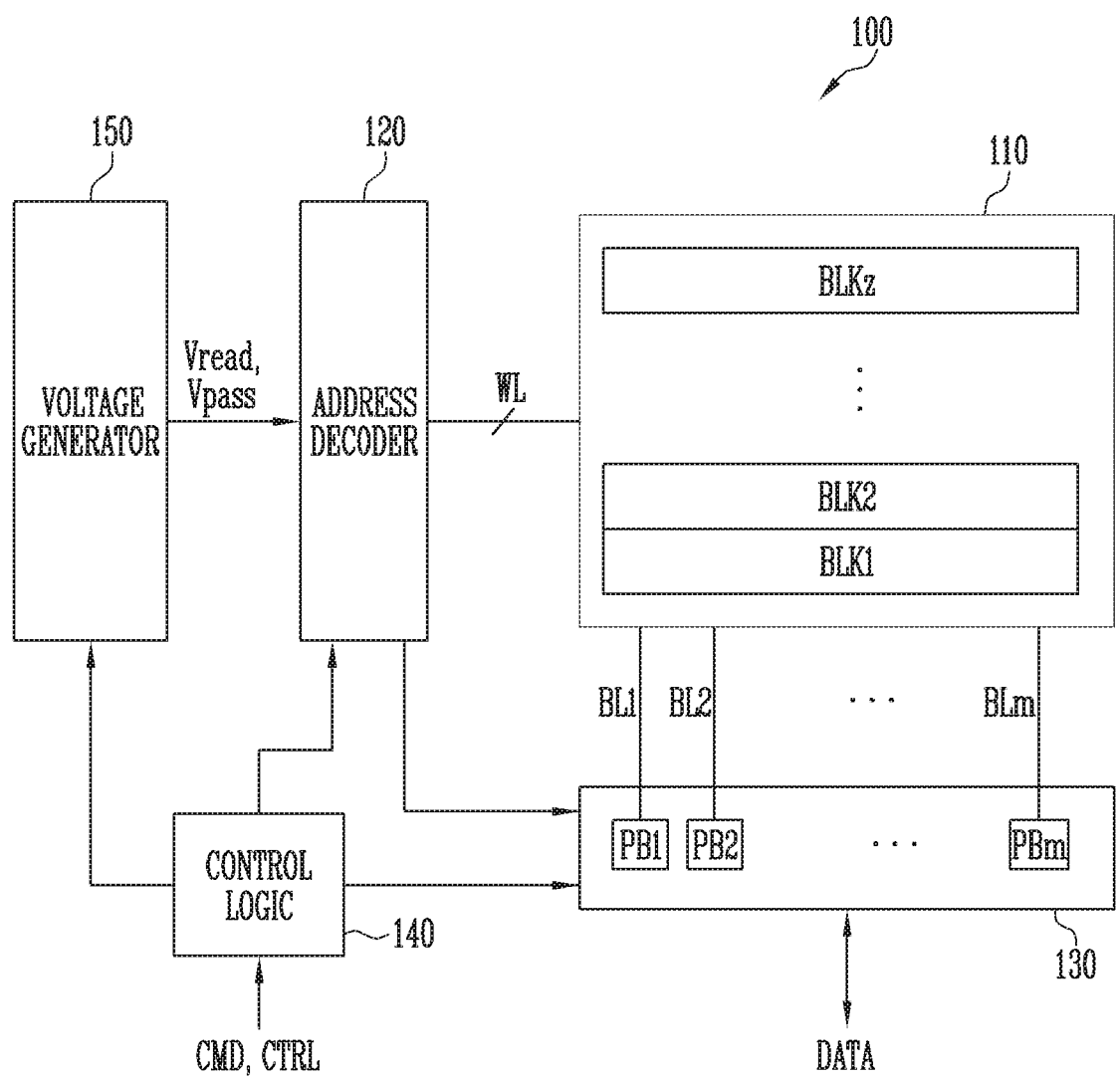
FIG. 2 is a block diagram illustrating a semiconductor memory device according to an embodiment of the present disclosure.

FIG. 2 is a block diagram illustrating a semiconductor memory device which, for example, may correspond to the semiconductor memory device 100 according to an embodiment of the present disclosure.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The memory blocks BLK1 to BLKz may be coupled to the address decoder 120 through word lines WL. The memory blocks BLK1 to BLKz may be coupled to the read and write circuit 130 through bit lines BL1 to BLm. Each of the memory blocks BLK1 to BLKz includes a plurality of memory cells. In an embodiment, the plurality of memory cells may be nonvolatile memory cells, which, for example, may have a vertical channel structure. In one embodiment, the memory cell array 110 may be implemented as a memory cell array having a two-dimensional (2D) structure. In another embodiment, the memory cell array 110 may be implemented as a memory cell array having a three-dimensional (3D) structure.

Each of the memory cells in the memory cell array may store at least one bit of data. In an embodiment, each of the memory cells in the memory cell array 110 may be a single-level cell (SLC), which stores 1-bit data. In an embodiment, each of the memory cells in the memory cell array 110 may be a multi-level cell (MLC), which stores 2-bit data. In an embodiment, each of the memory cells in the memory cell array 110 may be a triple-level cell (TLC), which stores 3-bit data. In an embodiment, each of the memory cells in the memory cell array 110 may be a quad-level cell (QLC), which stores 4-bit data. In various embodiments, the memory cell array 110 may include a plurality of memory cells, each of which stores 5 or more bits of data.

The address decoder 120, the read and write circuit 130, the control logic 140, and the voltage generator 150 are operated as a peripheral circuit for driving the memory cell array 110. The address decoder 120 is coupled to the memory cell array 110 through the word lines WL. The address decoder 120 may be operated under the control of the control logic 140. The address decoder 120 may receive addresses through an input/output buffer in the semiconductor memory device 100.

The address decoder 120 may decode a block address, among the received addresses. The address decoder 120 selects at least one memory block based on the decoded block address. When a read voltage application operation is performed during a read operation, the address decoder 120 may apply a read voltage Vread, generated by the voltage generator 150, to a selected word line of a selected memory block and may apply a pass voltage Vpass to remaining unselected word lines. During a program verify operation, the address decoder 120 may apply a verify voltage, generated by the voltage generator 150, to a selected word line of a selected memory block and may apply the pass voltage Vpass to remaining unselected word lines.

The address decoder 120 may decode a column address, among the received addresses. The address decoder 120 may transmit the decoded column address to the read and write circuit 130.

Each of the read and program operations of the semiconductor memory device 100 may be performed on a page basis. Addresses received at the request of read and program operations may include a block address, a row address, and a column address. The address decoder 120 may select one memory block and one word line in accordance with the block address and the row address. The column address may be decoded by the address decoder 120 and may then be provided to the read and write circuit 130. The address decoder 120 may include a block decoder, a row decoder, a column decoder, an address buffer, etc.

The read and write circuit 130 includes a plurality of page buffers PB1 to PBm. The read and write circuit 130 may be operated as a "read circuit" during a read operation of the memory cell array 110 and as a "write circuit" during a write operation. The plurality of page buffers PB1 to PBm are coupled to the memory cell array 110 through the bit lines BL1 to BLm. During a read or program verify operation, in order to sense threshold voltages of the memory cells, the page buffers PB1 to PBm may continuously supply sensing current to the bit lines coupled to the memory cells. At this time, each of the page buffers PB1 to PBm senses, through a sensing node, a change in the amount of flowing current (depending, for example, on the program state of a corresponding memory cell) and latches it as sensing data. The read and write circuit 130 is operated in response to page buffer control signals output from the control logic 140.

During a read operation, the read and write circuit 130 may sense data stored in the memory cells and temporarily store read data. The read and write circuit 130 may then output data DATA to the input/output buffer of the semiconductor memory device 100. In an embodiment, the read and write circuit 130 may include, for example, a column select circuit or the like as well as the page buffers (or page resistors).

The control logic 140 is coupled to the address decoder 120, the read and write circuit 130, and the voltage generator 150. The control logic 140 may receive one or more commands CMD and one or more control signals CTRL through the input/output buffer of the semiconductor memory device 100. The control logic 140 may control the overall operation of the semiconductor memory device 100 in response to the one or more control signals CTRL. The control logic 140 may output a control signal for controlling a precharge potential level at the sensing node of the plurality of page buffers PB1 to PBm. The control logic 140 may control the read and write circuit 130 to perform a read operation of the memory cell array 110.

The voltage generator 150 may generate a read voltage Vread and a pass voltage Vpass for a read operation in response to a control signal output from the control logic 140. In one embodiment, the voltage generator 150 may include a plurality of pumping capacitors for receiving an internal supply voltage in order to generate a plurality of voltages having various voltage levels. The voltage generator 150 may generate the plurality of voltages by selectively enabling corresponding ones or combinations of the plurality of pumping capacitors under the control of the control logic 140.

The address decoder 120, the read and write circuit 130, and the voltage generator 150 may function as peripheral circuits which perform a read operation, a write operation, and an erase operation on the memory cell array 110. The peripheral circuits may perform a read operation, a write operation, and an erase operation on the memory cell array 110 under the control of the control logic 140.

Figure 3:
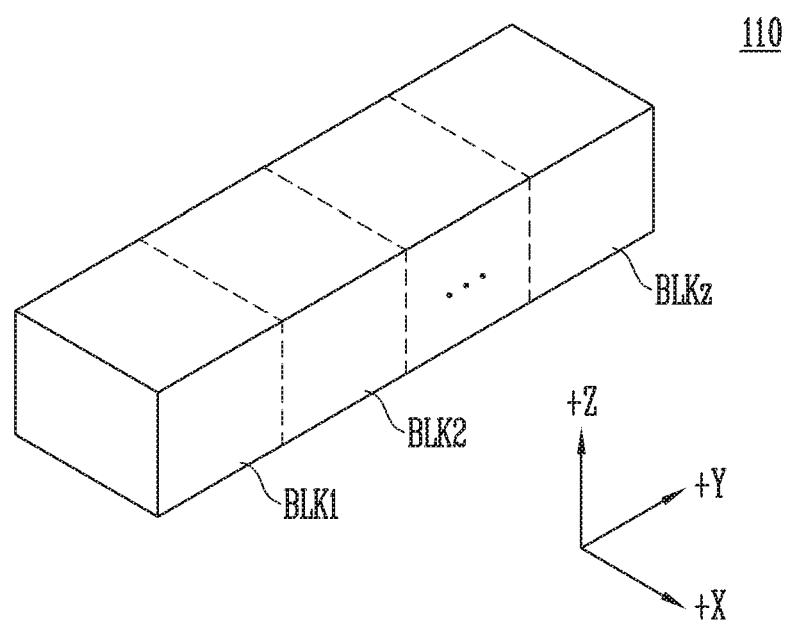
FIG. 3 is a diagram illustrating an embodiment of a memory cell array of FIG. 2.

FIG. 3 is a diagram illustrating an embodiment of the memory cell array 110 of FIG. 2. The memory cell array 110 may correspond, for example, to a storage area. Referring to FIG. 3, the memory cell array 110 may include a plurality of memory blocks BLK1 to BLKz, each of which may have a three-dimensional (3D) structure. The three-dimensional structure of each memory block may include a plurality of memory cells stacked on a substrate. Such memory cells may be arranged along a positive X (+X) direction, a positive Y (+Y) direction, and a positive Z (+Z) direction. Examples of the structure of each memory block will be described in detail below with reference to FIGS. 4 and 5.

Figure 4:
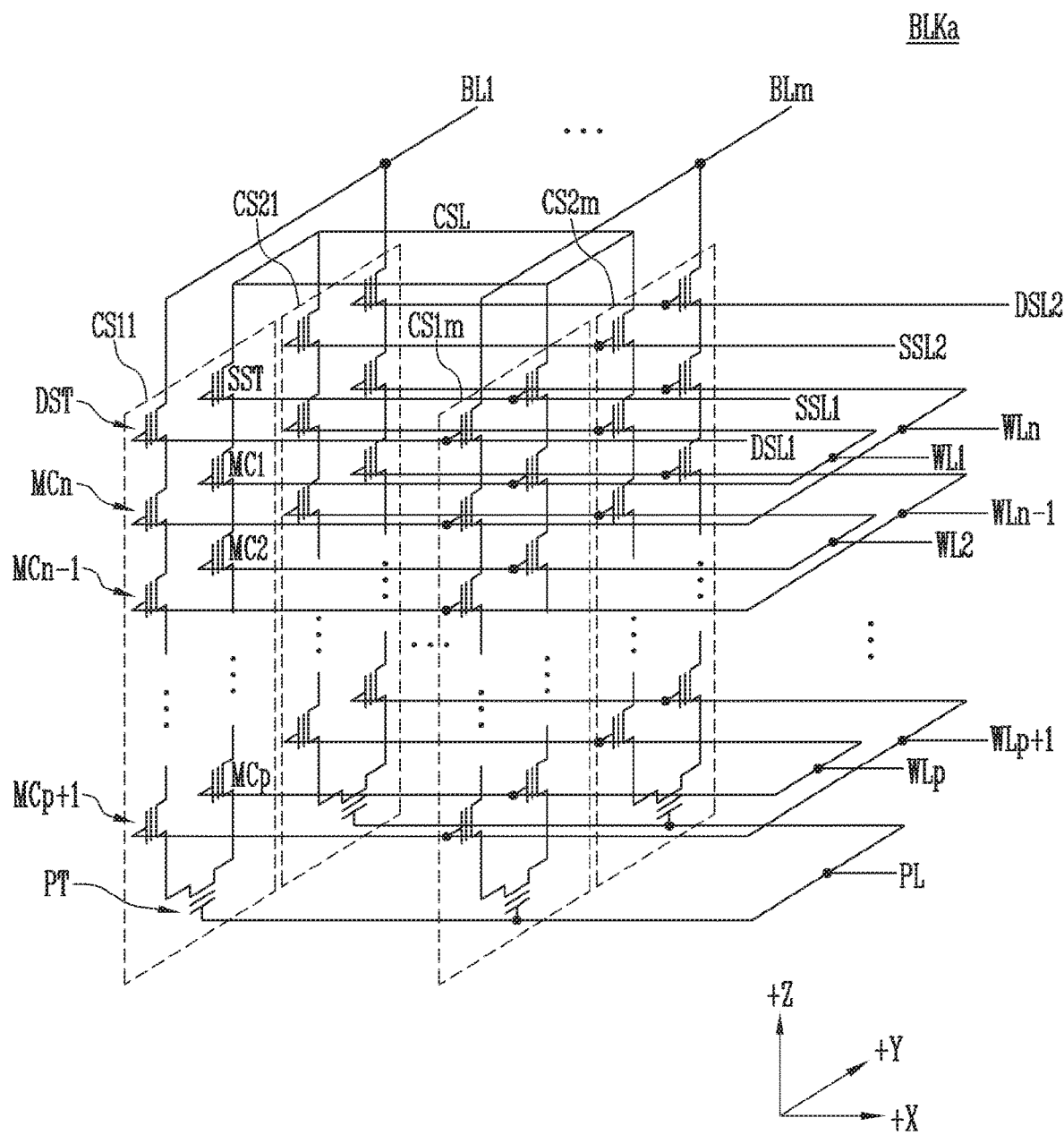
FIG. 4 is a circuit diagram illustrating any one memory block BLKa of memory blocks BLK1 to BLKz of FIG. 3 according to an embodiment.

FIG. 4 is a diagram illustrating a memory block BLKa, which represents an example circuit structure of each of the memory blocks BLK1 to BLKz of FIG. 3

Referring to FIG. 4, the memory block BLKa may include a plurality of cell strings CS11 to CS1$m$ and CS21 to CS2$m$. In an embodiment, each of the cell strings CS11 to CS1$m$ and CS21 to CS2$m$ may be formed in a predetermined shape, e.g., a 'U' shape. In the memory block BLKa, m cell strings are arranged in a row direction (e.g., a positive (+) X direction). In FIG. 4, two cell strings are illustrated as being arranged in a column direction (e.g., a positive (+) Y direction). However, this illustration is made for convenience of description, and it will be understood that three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

The select transistors SST and DST and the memory cells MC1 to MCn may, for example, have similar structures, respectively, but these structures may be different in another embodiment. Also, in an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp. In an embodiment, the source select transistors of cell strings arranged in the same row are coupled to a source select line extending in a row direction, and source select transistors of cell strings arranged in different rows may be coupled to different source select lines. In FIG. 4, source select transistors of cell strings CS11 to CS1$m$ in a first row are coupled to a first source select line SSL1. The source select transistors of cell strings CS21 to CS2$m$ in a second row are coupled to a second source select line SSL2. In an embodiment, source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively. The gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extending in a row direction. Drain select transistors of cell strings CS11 to CS1$m$ in the first row are coupled to a first drain select line DSL1. Drain select transistors of cell strings CS21 to CS2$m$ in a second row are coupled to a second drain select line DSL2.

Cell strings arranged in a column direction are coupled to bit lines extending in a column direction. In FIG. 4, cell strings CS11 and CS21 in a first column are coupled to a first bit line BL1. Cell strings CS1$m$ and CS2$m$ in an m-th column are coupled to an m-th bit line BLm.

The memory cells coupled to the same word line in cell strings arranged in a row direction constitute a single page. For example, memory cells coupled to the first word line WL1, among the cell strings CS11 to CS1$m$ in the first row, constitute a single page. Memory cells coupled to the first word line WL1, among the cell strings CS21 to CS2$m$ in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines may be provided, instead of first to m-th bit lines BL1 to BLm. Further, even-numbered cell strings, among the cell strings CS11 to CS1$m$ or CS21 to CS2$m$ arranged in a row direction, may be coupled to the even bit lines, respectively. Also, odd-numbered cell strings, among the cell strings CS11 to CS1$m$ or CS21 to CS2$m$ arranged in the row direction, may be coupled to the odd bit lines, respectively.

In an embodiment, one or more of the first to n-th memory cells MC1 to MCn may be used as dummy memory cells. For example, one or more dummy memory cells may be provided to reduce an electric field between the source select transistor SST and the memory cells MC1 to MCp. In an embodiment, the one or more dummy memory cells may be provided to reduce an electric field between the drain select transistor DST and the memory cells MCp+1 to MCn. As more dummy memory cells are provided, the reliability of the operation of the memory block BLKa may be improved, but the size of the memory block BLKa may be increased. As fewer dummy memory cells are provided, the size of the memory block BLKa may be reduced, but the reliability of the operation of the memory block BLKa may be deteriorated.

In order to efficiently control the one or more dummy memory cells, each of the dummy memory cells may have a threshold voltage. Before or after an erase operation of the memory block BLKa is performed, a program operation may be performed on all or some of the dummy memory cells. When an erase operation is performed after the program operation has been performed, the threshold voltages of the dummy memory cells may control the voltages that are applied to the dummy word lines coupled to respective dummy memory cells, and thus the dummy memory cells may achieve their threshold voltages.

Figure 5:
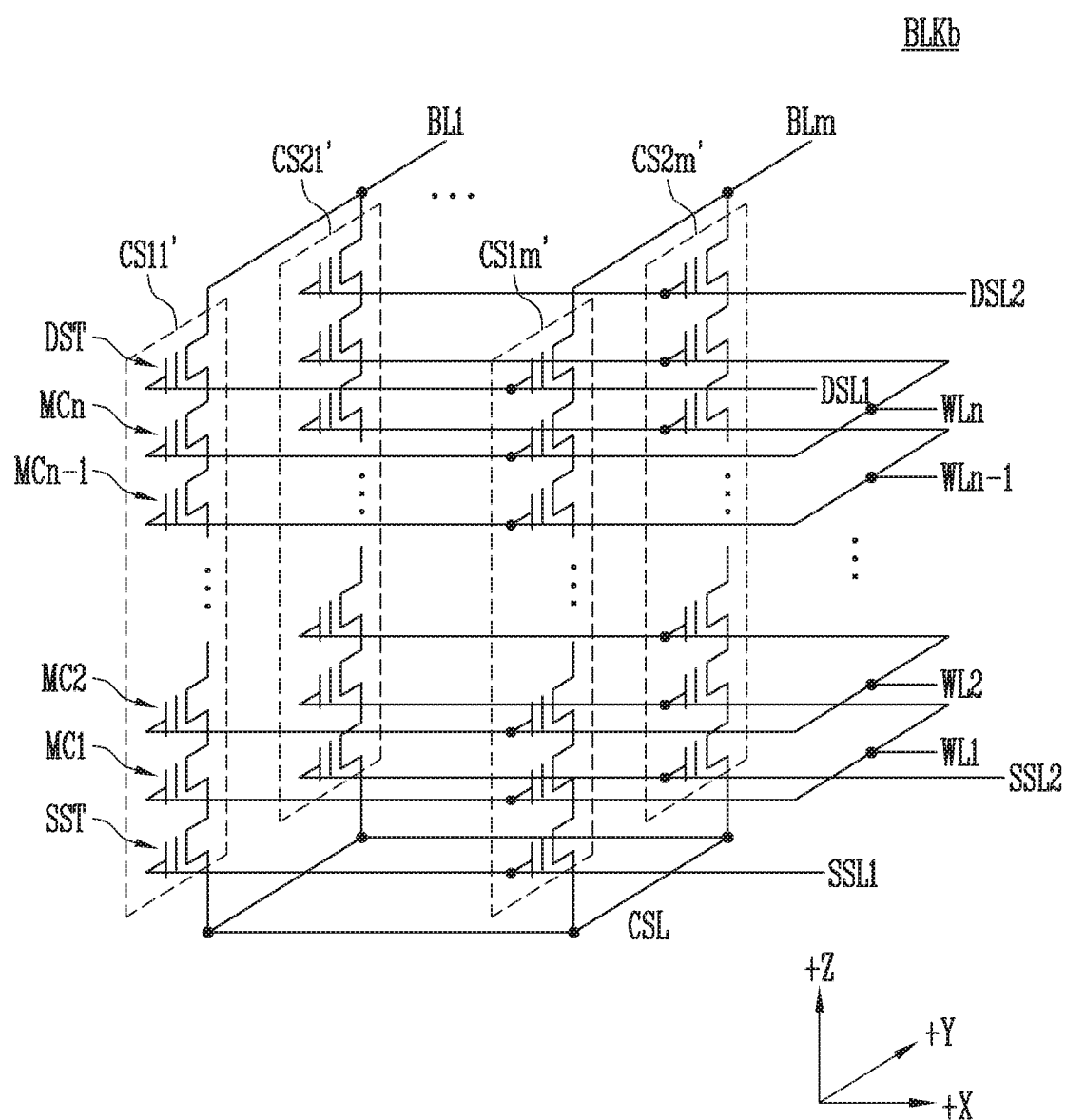
FIG. 5 is a circuit diagram illustrating an example of any one memory block BLKb of the memory blocks BLK1 to BLKz of FIG. 3 according to an embodiment.

FIG. 5 is a circuit diagram illustrating a memory block BLKb, which may be representative of another embodiment of the structure of each of the memory blocks BLK1 to BLKz of FIG. 3.

Referring to FIG. 5, the memory block BLKb may include a plurality of cell strings CS11' to CS1$m$' and CS21' to CS2$m$'. Each of the plurality of cell strings CS11' to CS1$m$' and CS21' to CS2$m$' extends along a positive Z (+Z) direction. Each of the cell strings CS11' to CS1m' and CS21' to CS2m' may include at least one source select transistor SST, first to n-th memory cells MC1 to MCn, and at least one drain select transistor DST, which are stacked on a substrate below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extended in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 may have an equivalent circuit similar to that of the memory block BLKa of FIG. 4, except that a pipe transistor PT is excluded from each cell string.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. In one embodiment, the one or more dummy memory cells may be provided to reduce an electric field between the drain select transistor DST and the memory cells MC1 to MCn. As more dummy memory cells are provided, the reliability of the operation of the memory block BLKb may be improved, but the size of the memory block BLKb may be increased. As fewer dummy memory cells are provided, the size of the memory block BLKb may be reduced, but the reliability of the operation of the memory block BLKb may be deteriorated.

In order to efficiently control the one or more dummy memory cells, each of the dummy memory cells may have a threshold voltage. Before or after an erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells. As a result, the dummy memory cells may achieve their threshold voltages.

Figure 6:
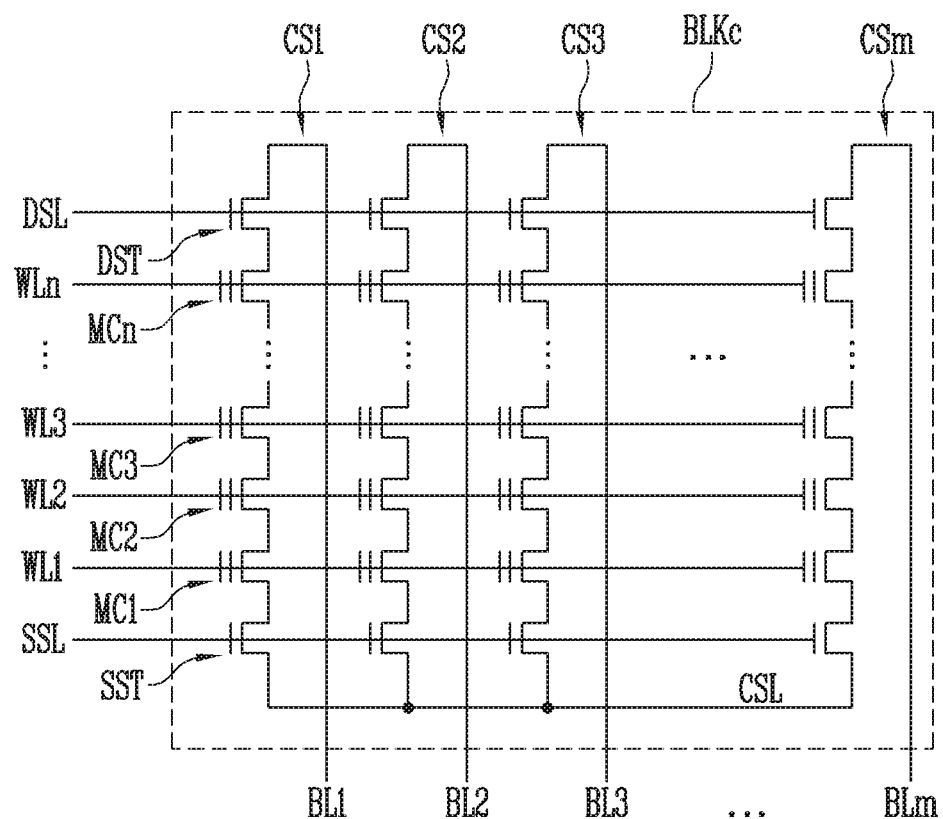
FIG. 6 is a circuit diagram illustrating an example of any one memory block BLKc of the memory blocks BLK1 to BLKz included in the memory cell array 110 of FIG. 2.

FIG. 6 is a circuit diagram illustrating a memory block BLKc, which may be a representative example of the structure of each of the memory blocks BLK1 to BLKz in the memory cell array 110 of FIG. 2.

Referring to FIG. 6, the memory block BLKc may include a plurality of cell strings CS1 to CSm coupled to a plurality of bit lines BL1 to BLm, respectively. Each of the cell strings CS1 to CSm includes at least one source select transistor SST, first to n-th memory cells MC1 to MCn, and at least one drain select transistor DST.

The select transistors SST and DST and the memory cells MC1 to MCn may have similar structures. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and the memory cells MC1 to MCn.

The first to n-th memory cells MC1 to MCn in each cell string are coupled between the source select transistor SST and the drain select transistor DST.

The drain select transistor DST of each cell string is coupled between the corresponding bit line and the memory cells MC1 to MCn.

The memory cells coupled to the same word line may constitute a single page. The cell strings CS1 to CSm may be selected by selecting the drain select line DSL. One page may be selected from the selected cell strings by selecting any one of the word lines WL1 to WLn.

In other embodiments, even bit lines and odd bit lines may be provided instead of the first to m-th bit lines BL1 to BLm. For example, among the cell strings CS1 to CSm, even-numbered cell strings may be coupled to the even bit lines, respectively, and odd-numbered cell strings may be coupled to the odd bit lines, respectively.

Figure 7:
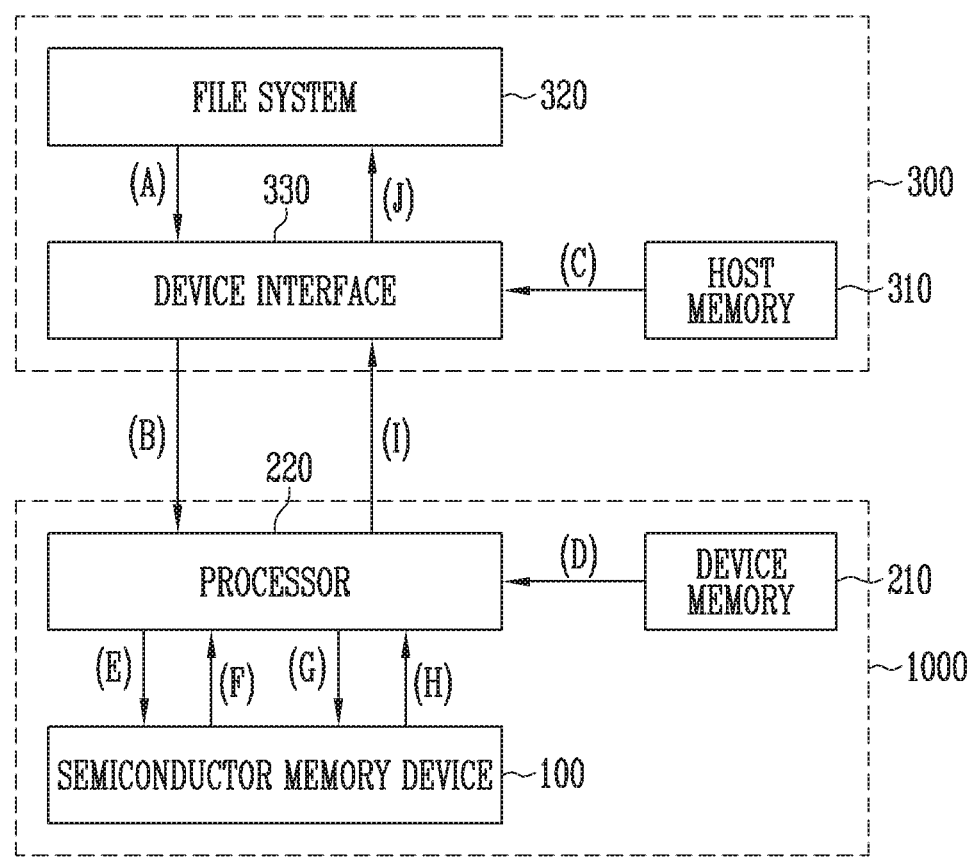
FIG. 7 is a block diagram illustrating an operation performed between a host and a storage device according to an embodiment of the present disclosure.

FIG. 7 is a block diagram illustrating an operation performed between a host 300 and a storage device 1000 according to an embodiment of the present disclosure. Referring to FIG. 7, the host 300 may include a host memory 310, a file system 320, and a device interface 330. The storage device 1000 may include a semiconductor memory device 100, a device memory 210, and a processor 220. The device memory 210 and the processor 220 may be included in the controller 200 of FIG. 1. In FIG. 7, among the components of the host 300 and the storage device 1000, some components are illustrated in order to explain operations related to the present disclosure with the understanding that host 300 and storage device 1000 may include additional features.

Prior to describing FIG. 7, operation of the storage device 1000 will be discussed. In one embodiment, the storage device 1000 may perform a write operation and a read operation on a page basis and may perform an erase operation on a memory block basis. Additionally, the storage device 1000 may have a flash translation layer (FTL) in the controller 200, and may perform one or more command operations, internal operations, or the like through the FTL. For example, the controller 200 may control the semiconductor memory device 100 in the storage device 1000 in response to a request from the host 300. Meanwhile, the controller 200 may perform an internal operation (e.g., a garbage collection operation, a read reclaim operation, and a wear leveling operation) regardless of a request from the host 300. For example, the controller 200 may perform the above operations by executing the FTL using software. The FTL may be executed by the processor 220 of the controller 200. As a result, individual operations of the FTL may be performed by the processor 220.

Operations performed in response to a request from the host 300, as well as the aforementioned internal operations, may be realized, for example, by the FTL performing an address mapping operation that involves translating a logical address (LA) provided by the host 300 into a physical address (PA) of the storage device 1000. When performing an address mapping operation using the FTL, the storage device 1000 may use a mapping table (e.g., a logical-to-physical mapping table (L2P mapping table)) to store mapping information (e.g., map data) between the logical address (LA) provided by the host 300 and the physical address (PA) of the storage device 1000.

As the capacity of the storage device 1000 increases, the size of the mapping table inevitably increases. As a result, the time for the storage device 1000 to search the mapping table increases. This, in turn, may adversely affect the operation speed of the storage device 1000. In order to solve this problem, a plurality of host mapping tables may be provided in the host 300, and the mapping table of the storage device 1000 may be synchronized with the host mapping tables. As a result, the address mapping operation may be primarily performed by the host 300. This operation may be referred to as a "host performance booster (HPB) operation".

Referring to FIG. 7, a process is illustrated for performing a read operation based on the host mapping tables in the host 300 and an operation for performing synchronization between the host mapping tables and the mapping table in the storage device 1000.

The file system 320 of the host 300 may generate a data write and read request in accordance with an operating system (OS). The host memory 310 may store the host mapping tables, which may include mapping information (e.g., map data) regarding all or some of user data stored in the semiconductor memory device 100. The device interface 330 may transmit data read requests and data write requests and may write data to the storage device 1000 under the control of the file system 320. Also, the device interface 330 may transfer read data from the storage device 1000 to the file system 320.

The device interface 330 may be a device which is included in the host 300 and configured to transmit/receive data between the host 300 and the storage device 1000. The device interface 330 may be coupled to the storage device 1000 through, for example, a Parallel Advanced Technology Attachment (PATA) bus, a Serial ATA (SATA) bus, a Small Computer System Interface (SCSI), a Universal Serial BUS (USB) interface, a Peripheral Component Interconnect (PCI) interface, a Peripheral Component Interconnect Extended (PCIe) interface, or a NonVolatile Memory Express (NVMe) interface.

When the device interface 330 transmits the data read request to the storage device 1000, the mapping information received from the host memory 310 may be transmitted together with the data read request. For example, when mapping information regarding the logical address (LA) of data (corresponding to the read request to be transmitted to the storage device 1000) is included in the host mapping tables stored in the host memory 310, the device interface 330 may transmit the mapping information together with the read request to the storage device 1000. For example, when mapping information regarding the logical address (LA) of the data (corresponding to the read request to be transmitted to the storage device 1000) is not included in the host mapping tables stored in the host memory 310, the device interface 330 may transmit only the read request to the storage device 1000 without mapping information.

When the storage device 1000 receives a specific operation request from the host 300, the FTL executed by the processor 220 may generate a command for performing the corresponding request and transfer the command to the semiconductor memory device 100. For example, when the storage device 1000 receives a data write request from the host 300, the FTL executed by the processor 220 may generate a program command and transfer the program command to the semiconductor memory device 100. In this case, program data together with the program command may be transferred to the semiconductor memory device 100. When the storage device 1000 receives the data read request from the host 300, the FTL executed by the processor 220 may generate a read command and transfer the read command to the semiconductor memory device 100.

During a data program operation, the controller 200 may update mapping information regarding the program data. As a result, the mapping table may be updated. The updated mapping table may be stored in the semiconductor memory device 100.

During a data read operation, the controller 200 requires mapping information regarding read data. When the mapping information corresponding to the read data is cached in the device memory 210, the controller 200 may generate a read command corresponding to the received read request and transfer the read command to the semiconductor memory device 100. When mapping information corresponding to the read data is not cached in the device memory 210, the controller 200 transfers a read command for the mapping information to the semiconductor memory device 100. When the semiconductor memory device 100 reads the mapping information and transfers the mapping information to the FTL, the FTL may transfer the read command for reading data, together with a physical address (PA) corresponding to the received mapping information, to the semiconductor memory device 100. The semiconductor memory device may read data corresponding to the received read command and transfer the read data to the FTL of the controller 200. The controller 200 transmits the received data to the host 300. The device interface 330 of the host 300 transfers the received data to the file system 320.

In one embodiment, the device memory 210 of the storage device 1000 may be a volatile memory, e.g., a DRAM device. In an embodiment, the device memory 210 may be a static random access memory (SRAM) device.

In some cases, the device memory 210 of the controller 200 in the storage device 1000 may have a capacity that is less than that of the host memory 310. Consequently, space for maintaining the mapping table in the device memory 210 may be insufficient. In accordance with an HBP operation, in order to improve the caching performance of the mapping table, all or part of the mapping table of the semiconductor memory device 100 may remain in the host memory 310. In this case, compared to the case where the mapping table is cached only in the device memory 210, a cache-hit probability for the mapping information may increase. This, in turn, may increase the data read speed between the host 300 and the storage device 100.

Figure 8A:
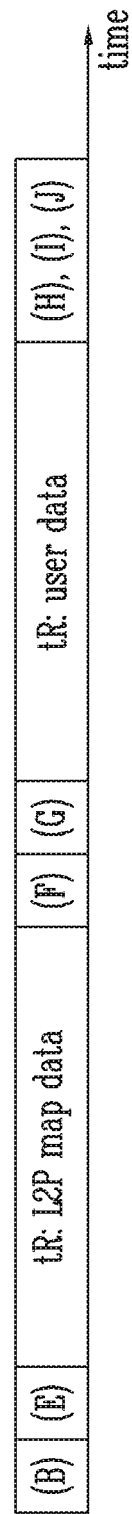
FIG. 8A is a timing diagram illustrating a data read operation when a cache miss for mapping information occurs.
Figure 8B:
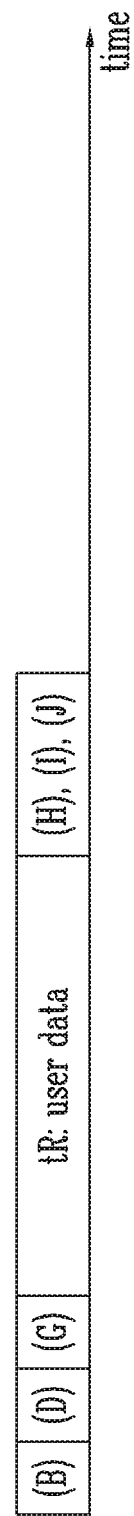
FIG. 8B is a timing diagram illustrating a data read operation when a cache hit for mapping information occurs in a device memory 210.
Figure 8C:
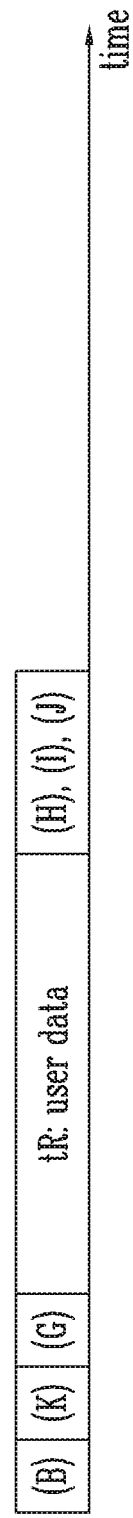
FIG. 8C is a timing diagram illustrating a data read operation when a cache hit for mapping information occurs in a host memory 310.

FIG. 8A is a timing diagram illustrating an embodiment of a data read operation that may be performed when a cache miss for mapping information occurs. FIG. 8B is a timing diagram illustrating an embodiment of a data read operation that may be performed when a cache hit for mapping information occurs in a device memory 210. FIG. 8C is a timing diagram illustrating an embodiment of a data read operation that may be performed when a cache hit for mapping information occurs in a host memory 310. The data read operations performed when a cache miss for mapping information occurs and a cache hit for mapping information occurs will now be described with reference to FIGS. 7 and 8A to 8c.

When the host 300 desires to read data, the file system 320 transfers a control signal for reading the corresponding data to the device interface 330 (at A). When mapping information corresponding to the read data is stored in the host memory 310, the host memory 310 transfers the corresponding mapping information to the device interface 330. Here, the device interface 330 may transmit the corresponding mapping information together with the read request to the storage device 1000. When the mapping information corresponding to the read data is not stored in the host memory 310, the device interface 330 may transmit only the read request to the storage device 1000 without transmitting mapping information.

FIG. 8A illustrates an embodiment of an operation that may be performed when mapping information corresponding to the read data is stored neither in the host memory 310 nor in the device memory 210. The device interface 330 transmits only a read request to the storage device 1000 without transmitting mapping information (at B). The FTL executed by the processor 220 fetches the received read request. When mapping information corresponding to the received read request is not stored in the device memory 210, the controller 200 transfers a read command for reading mapping information to the semiconductor memory device 100 (at E). The semiconductor memory device 100 reads mapping information corresponding to the received read command. At this stage, the time tR to read L2P map data, including the corresponding mapping information from the memory cell array 111 of the semiconductor memory device 100, may be taken. The semiconductor memory device 100 transfers the read mapping information to the controller 200 (at F). At this stage, the received mapping information may be cached in the device memory 210.

The FTL may transfer a read command for reading data desired to be originally read (e.g., user data), together with a physical address corresponding to the read command, to the semiconductor memory device 100 based on the received mapping information (at G). The semiconductor memory device 100 reads the user data corresponding to the received read command. At this stage, the time tR to read the user data from the memory cell array 111 may be taken. The read user data may be transferred to the controller 200 (at H) and may be transmitted from the controller 200 to the host 300 (at I). The device interface 330 of the host 300 transfers the received user data to the file system 320 (at J).

Thus, referring to FIG. 8A, it can be seen that, when mapping information corresponding to the read data is stored neither in the host memory 310 nor in the device memory 210, the time required to read L2P map data is additionally taken. As a result, the total read time is increased.

FIG. 8B illustrates an embodiment of an operation that may be performed when mapping information corresponding to the read data is stored in the device memory 210. In this operation, the device interface 330 transmits only a read request to the storage device 1000 without transmitting mapping information (at B). The FTL executed by the processor 220 fetches the received read request. Since the mapping information corresponding to the received read request is stored in the device memory 210, the controller 200 receives the mapping information from the device memory 210 (at D). The FTL transfers a read command for reading user data, together with a physical address corresponding to the read command, to the semiconductor memory device 100 based on the received mapping information (at G).

The semiconductor memory device 100 then reads the user data corresponding to the received read command. At this stage, the time tR to read the user data from the memory cell array 111 may be taken. The read user data may be transferred to the controller 200 (at H) and may be transmitted from the controller 200 to the host 300 (at I). The device interface 330 of the host 300 transfers the received user data to the file system 320 (at J).

Thus, referring to FIG. 8B, it can be seen that, when the mapping information corresponding to the read data is stored in the device memory 210, the read time to read L2P map data is not taken. As a result, the total read time may be reduced.

FIG. 8C illustrates an embodiment of an operation that may be performed when mapping information corresponding to the read data is stored in the host memory 310. The device interface 330 transmits mapping information received from the host memory 310, together with a read request, to the storage device 1000 (at B). The FTL executed by the processor 220 fetches the received read request. Along with this procedure, the FTL also determines whether the mapping information received from the host memory 310 is valid (at K). When the mapping information received from the host memory 310 is valid, the FTL transmits a read command for reading the user data, together with a physical address corresponding to the read command, to the semiconductor memory device 100 based on the received mapping information (at G). The semiconductor memory device 100 reads the user data corresponding to the received read command. At this stage, the time tR required to read the user data from the memory cell array 111 may be taken. The read user data may be transferred to the controller 200 (at H) and may be transmitted from the controller 200 to the host 300 (at I). The device interface 330 of the host 300 transfers the received user data to the file system 320 (at J).

Thus, referring to FIG. 8C, it can be seen that, when the mapping information corresponding to the read data is stored in the host memory 310, the read time required to read L2P map data is not taken. As a result, the total read time may be reduced.

Referring to FIGS. 8A to 8C, it can be seen that, compared to a case where the mapping information corresponding to the read data is neither stored in the host memory 310 nor in the device memory 210 (in FIG. 8A), read speed may be improved by storing mapping information in at least one of the device memory 210 or the host memory 310 (the case of FIG. 8B or 8C).

Figure 9:
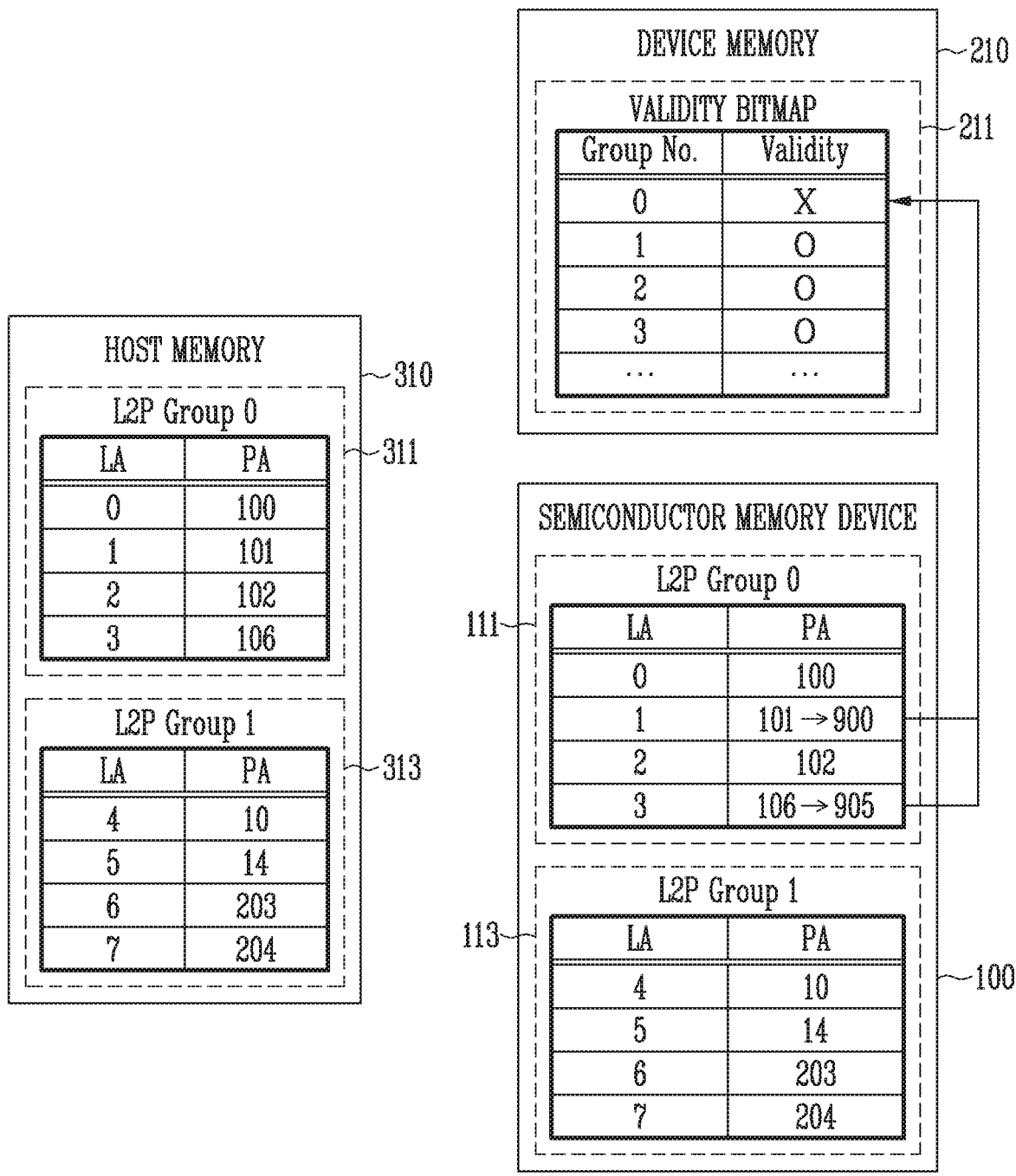
FIG. 9 is a diagram explaining operations performed in a case where mapping information stored in a host memory is valid and in a case where the mapping information is invalid.

FIG. 9 is a diagram explaining an embodiment of operations that may be performed in a case where mapping information stored in a host memory is valid and in a case where the mapping information is invalid.

Referring to FIG. 9, the host memory 310, the device memory 210, and the semiconductor memory device 100 are illustrated. The host memory 310 stores L2P group 0 (311) and L2P group 1 (313). Each of these L2P groups may store units of L2P map data, which include a plurality of pieces of mapping information. Also, in the example of FIG. 9, each of the L2P groups 311 and 313 includes four entries, with each entry including mapping information corresponding to page-unit data. The configuration of the L2P groups in FIG. 9 is exemplary, and various types and/or numbers of L2P groups may be included in the host memory 310 another embodiment. For example, the number of pieces of mapping information in each of the L2P groups 311 and 313 (e.g., the number of entries) may be designed in various ways different from that shown in FIG. 9. AlsO, in this example, the L2P group 0 maps relationships between logical addresses (LA) of 0, 1, 2, and 3 and physical addresses (PA) of 100, 101, 102, and 106, respectively. The L2P group 1 maps relationships between logical addresses (LA) of 4, 5, 6, and 7 and physical addresses (PA) of 10, 14, 203, and 204, respectively.

In one embodiment, the semiconductor memory device 100 may store mapping information regarding the entire data. The mapping information stored in the semiconductor memory device 100 may or may not be stored on an L2P group basis. For easy comparison with the mapping information stored on an L2P group basis in the host memory 310, the mapping information stored in the semiconductor memory device 100 is also illustrated as being stored in an L2P group basis, e.g., in the embodiment of FIG. 9 the semiconductor memory device 100 stores in L2P group 0 (111) and the L2P group 1 (113). While two group are shown, the semiconductor memory device 100 may store pieces of mapping information corresponding to a different (e.g., smaller or larger) number of L2P groups and/or may store groups having a different structure, either by themselves or in addition to the illustrated groups.

The device memory 210 may include a validity bitmap 211. The validity bitmap 211 may be a table indicating whether pieces of mapping information of respective L2P groups currently stored in the host memory 310 are valid.

In one embodiment, immediately after each L2P group has been stored in the host memory 310, the entire mapping information in the corresponding group may be considered to be valid. Therefore, when each L2P group is stored in the host memory 310, the validity of the corresponding L2P group in the validity bitmap is stored as "0". In relation to the validity bitmap stored in the host memory 310, a specific L2P group being valid may mean that all mapping information of the corresponding L2P group is identical to that of the L2P group stored in the semiconductor memory device 100. Therefore, at a time point at which the mapping information of L2P Group 0 and the mapping information of L2P Group 1 are stored in the host memory 310, pieces of mapping information of respective groups may be considered valid.

In an embodiment, the storage device 1000 may perform an operation of changing the physical location of data regardless of a request from the host 300. For example, the storage device 1000 may perform an internal operation (e.g., a garbage collection operation, a data migration operation for an SLC buffer, a read reclaim operation, a wear leveling operation, etc.) regardless of a request from the host 300.

The garbage collection operation may include an operation of storing valid pages, stored in a plurality of memory blocks including a plurality of invalid pages (e.g., victim blocks), in a target block which is a new free block. The data migration operation for the SLC buffer may include an operation of moving and writing data, stored in an SLC block in the semiconductor memory device 100, to an MLC block, a TLC block or a QLC block. The read reclaim operation may include an operation of newly writing the data stored in a memory block, a threshold voltage distribution of which is degraded due to repeated read operations after data has been programmed, to another memory block. The wear leveling operation may include an operation of shifting data, stored in a memory block on which the number of erase operations is small, to another memory block in order to equalize the use frequencies of a plurality of memory blocks in the semiconductor memory device 100. When the physical location of data changes due to the internal operation in this way, the physical address of the data may also change. As a result, valid mapping information of an L2P group may be invalidated.

For example, as illustrated in FIG. 9, the location of data corresponding to the mapping information in L2P group 0 may change due to the internal operation of the storage device 1000. The physical address (PA) of data corresponding to a logical address (LA) of 1 may change from 101 to 900, and the physical address (PA) of data corresponding to a logical address (LA) of 3 may change from 106 to 905. Since pieces of mapping information corresponding to 1 and 3, among the logical addresses (LA) of L2P group 0, have changed, the validity of L2P group 0 changes from 0 to X in the validity bitmap of the device memory. In this way, when at least one of the pieces of mapping information in the specific L2P group changes, the validity of the corresponding L2P group changes from "valid" to "invalid".

When the storage device 1000 receives mapping information together with a read request from the host 300, the controller 200 checks the validity of the L2P group including the corresponding mapping information. For this operation, the controller 200 checks the validity bitmap 211 of the device memory 210.

As a result of checking the validity bitmap 211, when the L2P group including the received mapping information is valid, the controller 200 may generate a read command corresponding to the received mapping information, and the read command may then be transferred to the semiconductor memory device 100 by the controller 200.

As a result of checking the validity bitmap 211, when the L2P group including the received mapping information is invalid, the controller 200 may determine whether valid mapping information corresponding to the read request is cached in the device memory 210. When the valid mapping information is cached in the device memory 210, the controller 200 generates a read command using the mapping information cached in the device memory 210. The read command is then transferred to the semiconductor memory device 100 by the controller 200.

When valid mapping information is not cached in the device memory 210, the controller 200 transfers a read command for reading the mapping information to the semiconductor memory device 100. The semiconductor memory device 100 reads mapping information corresponding to the received read command. The semiconductor memory device 100 transfers the read mapping information to the controller 200. The FTL may transfer a read command for reading data desired to be originally read (e.g., user data), together with a physical address corresponding to the read command, to the semiconductor memory device 100 based on the received mapping information.

As described above, even if mapping information, together with the read request, is received from the host 300, an operation similar to that of FIG. 8A or 8B may be performed when the corresponding mapping information is invalid. For example, when the mapping information received from the host 300 is invalid, a read operation similar to that of FIG. 8A may be performed unless mapping information is cached in the device memory 210. Further, when the mapping information received from the host 300 is invalid, a read operation similar to that of FIG. 8B may be performed when the mapping information is cached in the device memory 210. In addition, since the operation of determining whether the mapping information received from the host 300 is valid or invalid should be performed, read performance may be further degraded.

Therefore, in order to improve the performance of the read operation performed through the host 300 and the storage device 1000, the validity of the pieces of mapping information stored in the host memory 310 and L2P groups including the pieces of mapping information may be maintained for a period which is as long as possible. For this operation, an operation of updating the mapping information stored in the host memory 310 may be controlled. For example, when it is predicted that a data migration operation is to be internally performed in the storage device 1000 in some time in the future (e.g., at a near future time), a time point at which the storage device 1000 will transmit "mapping table entry information" to the host 300 may be delayed.

In one embodiment, the term "mapping table entry information" may refer to information that is transmitted from the storage device 1000 to the host 300 for use in identifying mapping information recommended to be stored in the host memory 310. For example, the mapping table entry information may be information recommended by the storage device 1000 as to which of one or more pieces of mapping information cached in the device memory 210 is desired to be stored in the host memory 310, rather than mapping information that is transferred to the host. That host 300 receives the mapping table entry information and transmits a read buffer request corresponding thereto to the storage device 1000. The storage device 1000 may transmit the mapping information corresponding to the received read buffer request to the host 300. In this procedure, the mapping information may be transmitted to the host 300, for example, on an L2P group basis.

When the mapping table entry information is transmitted from the storage device 1000 to the host 300, the storage device 1000 may receive a read buffer request corresponding to the mapping table entry information shortly thereafter, and then the mapping information of the corresponding L2P group may be stored or updated in the host memory 310. When the physical location of data corresponding to the mapping information changes immediately after the mapping information has been stored or updated in the host memory 310, the validity of the corresponding mapping information and the L2P group including the mapping information is not maintained, and thus read performance may be degraded.

In accordance with a controller and a method of operating the controller according to an embodiment of the present disclosure, when migration of data is expected, an operation of transmitting the mapping table entry information to the host may be delayed. Accordingly, the mapping table entry information is transmitted to the host after the migration of data. As a result, the validity of the corresponding mapping information and the L2P group including the mapping information may be maintained for a longer period of time. As a result, the performance of the read operation between the host 300 and the storage device 1000 may be improved.

Figure 10:
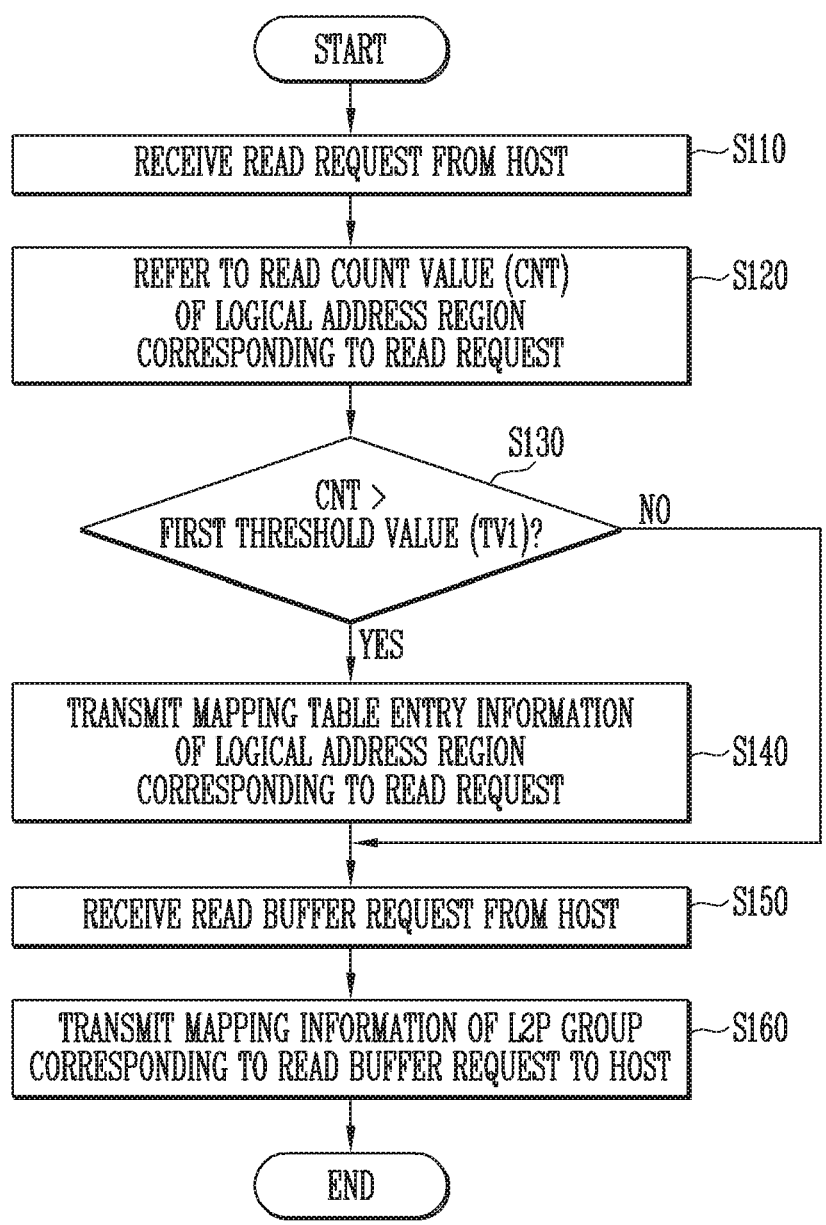
FIG. 10 is a flowchart illustrating a method of operating a controller according to an embodiment of the present disclosure.
Figure 11:
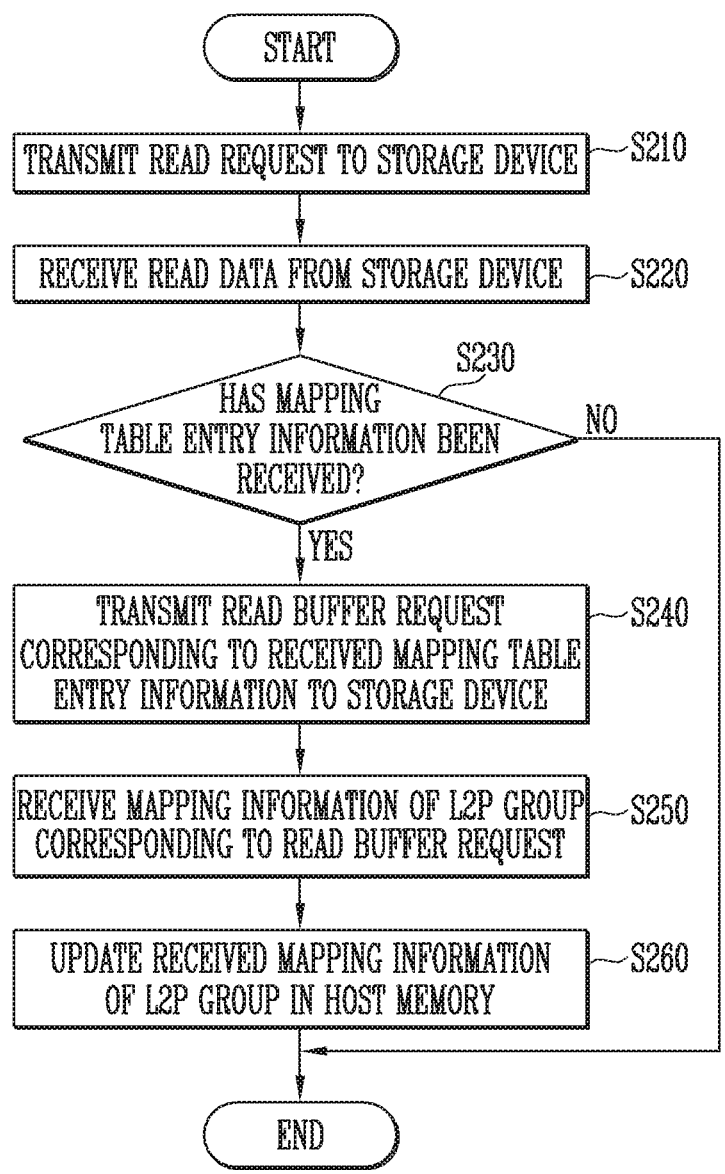
FIG. 11 is a flowchart illustrating a method of operating a host according to an embodiment of the present disclosure.
Figure 12:
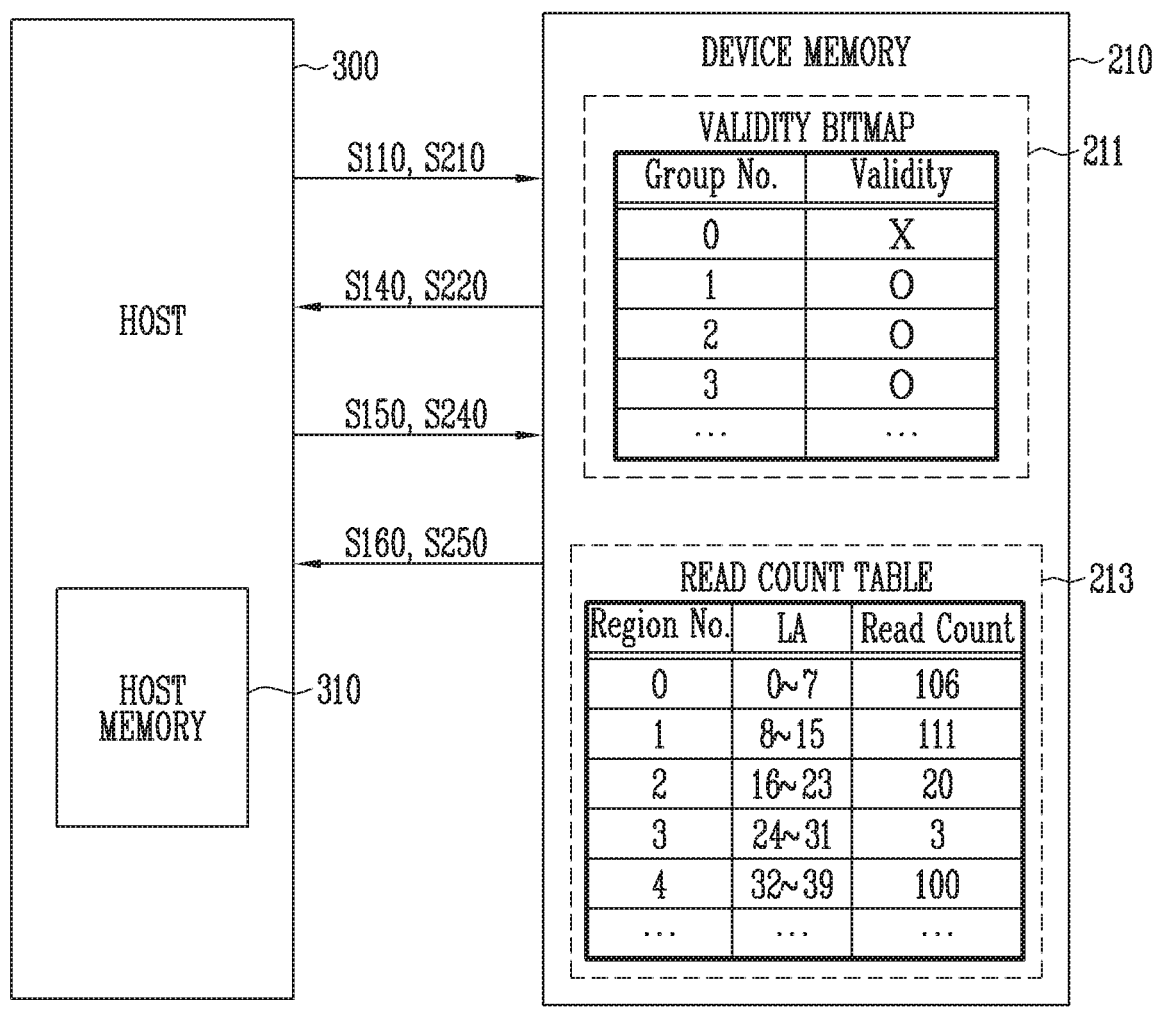
FIG. 12 is a diagram explaining the operation of FIGS. 10 and 11 according to an embodiment.

FIG. 10 is a flowchart illustrating a method of operating a controller according to an embodiment of the present disclosure. FIG. 11 is a flowchart illustrating a method of operating a host according to an embodiment of the present disclosure. FIG. 12 is a diagram explaining the operation of FIGS. 10 and 11.

First, the operation of the controller 200 will be described with reference to FIGS. 10 and 12. At operation S110, the controller 200 of the storage device 1000 may receive a read request from the host 300. At this operation, mapping information may or may not be transmitted from the host 300. For example, when the corresponding mapping information is stored in the host memory 310, the mapping information may be transmitted, together with the read request, to the storage device 1000. When the corresponding mapping information is not stored in the host memory 310, only the read request may be transmitted to the storage device 1000 without the mapping information being transmitted.

At operation S120, the controller 200 may refer to a read count value CNT of a logical address region corresponding to the received read request. The read count value CNT is referred to at operation S120 so as to perform a comparison with a first threshold value, which will be described later.

As illustrated in FIG. 12, the device memory 210 may store a read count table 213 together with a validity bitmap 211. Each entry in the read count table may include the number of read operations on each of a plurality of logical address regions. In the example of FIG. 12, region 0 includes logical addresses of 0 to 7. The number of read operations performed on data corresponding to the logical addresses of 0 to 7 is indicated to be 106. Region 1 includes logical addresses of 8 to 15. The number of read operations on data corresponding to the logical addresses of 8 to 15 is indicated to be 111. Region 2 includes logical addresses of 16 to 23. The number of read operations on data corresponding to the logical addresses of 16 to 23 is indicated to be 20. Region 3 includes logical addresses of 24 to 31. The number of read operations on data corresponding to the logical addresses of 24 to 31 indicated to be 3. Region 4 includes logical addresses of 32 to 39. The number of read operations on data corresponding to the logical addresses of 32 to 39 is indicated to be 100.

Also, in the example of FIG. 12, each logical address region is illustrated as including eight logical addresses (LA). Meanwhile, as described above with reference to FIG. 9, an L2P group (which is a unit for determining whether data is valid or invalid in the validity bitmap) may include four logical addresses (LA). Thus, in one embodiment, one logical address region may include two L2P groups. However, this is only exemplary, and a logical address region configuring each entry of the read count table 213 may include a different number of logical addresses in another embodiment. When, for example, each logical address region is configured to include four logical addresses (LA), the number of logical addresses included in each logical address region of the read count table may be identical to the number of logical addresses in the L2P group.

The fact that the read count value of a specific logical address region is large (e.g., above a predetermined value) may mean that the number of times that data in the corresponding logical address region is read is large. This may indicate that there is a need to cache map data of the corresponding logical address region. Therefore, the controller 200 may recommend that mapping information of a logical address region having a large read count value, among the logical address regions included in the read count table 213, should be stored in the host 300.

Thus, at operation S130, for this operation the controller 200 may perform an update operation that includes increasing the read count value of the logical address region corresponding to the received read request by 1. The controller 200 may also perform a comparison to determine whether the updated read count value CNT of the logical address region is greater than a first threshold value TV1.

At operation S140, when the read count value CNT is greater than the first threshold value TV1, the controller 200 may transmit the mapping table entry information of the logical address region corresponding to the read request to the host 300. Also, at operation S140, when the read count value CNT is greater than the first threshold value TV1, the mapping table entry information of the logical address region corresponding to the read request may be generated and the validity bitmap 211 may be checked. Based on the results of this check, the generated mapping table entry information may be transmitted to the host 300 when the mapping information stored in the host memory 310 is invalid or when mapping information is not stored in the host memory 310. In one embodiment, the mapping table entry information may not be transmitted to the host 300 when the mapping information stored in the host memory 310 is valid. The reason for this is that, when the mapping information is valid, there is no need to update the mapping information.

In the example of FIG. 12, at operation S110, a case where a read request for a fifth logical address is received is taken into consideration. The read count value of logical address region 0 including the fifth logical address has been updated with 106. This value is then compared to a first threshold value which, for example, may be 100. In this case, since the updated read count value is 106 which is greater than the first threshold value TV1 of 100 at operation S130, the process proceeds to operation S140. At operation S140, the validity bitmap 211 is referred to. The L2P groups corresponding to logical address region 0 are L2P group 0 and L2P group 1. Since L2P group 0 is invalid and L2P group 1 is valid, the mapping table entry information only for L2P group 0 is transmitted to the host 300. The reason for this is that L2P group 1 is valid, and thus there is no need to update L2P group 1.

At operation S150, the controller 200 may receive a read buffer request from the host 300. The read buffer request may include a read buffer request corresponding to the mapping table entry information transmitted to the host 300, at operation S140. For example, according to the above-described example, the read buffer request received by the controller 200 at operation S150 may be the read buffer request corresponding to L2P group 0.

At operation S160, the controller 200 may transmit one or more pieces of mapping information corresponding to logical addresses of 0 to 3 in L2P group 0 to the host 300.

Referring to FIG. 10, an embodiment is illustrated which includes, at operation S120, referring to the read count value of the corresponding logical address region. This operation is performed in response to operation S110 at which the read request is received from the host 300. At operation S130, the read count value is compared with the first threshold value TV1, and at operation S140 the mapping table entry information is transmitted to the host 300. However, the operation of transmitting the mapping table entry information to the host 300 at operation S140 may also be performed regardless of whether the read request is received from the host 300. For example, during an idle time of the storage device 1000, a logical address region having a read count value greater than the first threshold value TV1 may be selected from among all logical address regions, and mapping table entry information corresponding to the selected logical address region may be generated and transmitted to the host 300.

FIG. 11 describes operation of the host 300 in accordance with an embodiment, which operation is described with reference to FIG. 12.

At operation S210, the host 300 may transmit a read request to the storage device 1000. In performing this operation, the host 300 may transmit mapping information corresponding to the read request, together with the read request. In other examples, the host 300 may transmit only the read request to the storage device 1000 without transmitting mapping information. For example, when the corresponding mapping information is stored in the host memory 310, the mapping information may be transmitted, together with the read request, to the storage device 1000. When the corresponding mapping information is not stored in the host memory 310, the read request may be transmitted to the storage device 1000 without the mapping information being transmitted.

At operation S220, the host 300 may receive read data from the storage device 1000. The read data may include user data corresponding to the read request transmitted at operation S210.

At operation S230, the host 300 may determine whether mapping table entry information, together with the read data, has been received. When the storage device 1000 transmits the mapping table entry information to the host 300, the mapping table entry information may be transmitted, together with the read data, to the host 300. Therefore, at operation S230, a determination may be made as to whether the mapping table entry information has been received together with the read data when the read data is received. When the mapping table entry information has not been received at operation S230 (e.g., in case of "No"), the process may be terminated without updating the mapping information stored in the host memory 310.

At operation S240, when the mapping table entry information has been received together with the read data at operation S230 (e.g., in case of "Yes"), the host 300 may transmit a read buffer request corresponding to the received mapping table entry information to the storage device 1000. The read buffer request may be a request to output the mapping information of an L2P group corresponding to the mapping table entry information received by the host 300, among one or more pieces of mapping information cached in the device memory 210. In response to the read buffer request received at operation S240, the storage device 1000 may transmit mapping information corresponding to the read buffer request to the host 300.

At operation S250, the host 300 may receive the mapping information of the L2P group corresponding to the read buffer request from the storage device 1000.

At operation S260, the host 300 may update the received mapping information of the L2P group in the host memory 310.

Therefore, in order to improve the performance of the read operation performed through the host 300 and the storage device 1000, the validity of one or more pieces of mapping information stored in the host memory 310 and L2P groups including the one or more pieces of mapping information may be maintained for a period which is as long as possible. To achieve this operation, updating the mapping information stored in the host memory 310 may be controlled. For example, when it is predicted that a data migration operation is to be internally performed in the storage device 1000 at some future time (e.g., in the near future as determined, for example, by some predetermined time period) a time point at which the storage device 1000 will transmit "mapping table entry information" to the host 300 may be delayed.

In accordance with the embodiment illustrated in FIG. 10, the storage device 1000 may compare a fixed first threshold value TV1 with a read count value and thus the storage device 1000 may generate mapping table entry information regardless of whether performance of a data migration operation is predicted. The storage device 1000 may then transmit the mapping table entry information to the host 300. In this case, even if a data migration operation is predicted to be internally performed in the storage device 1000 at a time in the near future (e.g., within a predetermined time window), the mapping table entry information may be transmitted to the host 300 to thereby allow the mapping information of the host memory 310 to be updated. In this case, after the data migration operation, invalid mapping information is transmitted from the host 300 to the storage device 1000, and thus read performance between the host 300 and the storage device 1000 may be degraded.

In accordance with the storage device 1000 according to other embodiments, when a data migration operation is predicted to be internally performed in the storage device 1000, the storage device 1000 may be operated such that a time point at which "mapping table entry information" is to be transmitted to the host 300 is delayed. For this operation, depending on the features of the logical address region corresponding to the read request, a second threshold value TV2 may be calculated and used to determine whether to transmit mapping table entry information to the host. When it is determined that a data migration operation is to be internally performed in the storage device as a result of referring to the features of the logical address region corresponding to the read request, a weighted threshold value may be calculated. Examples of this process will be described with reference to FIGS. 13 to 18.

Figure 13:
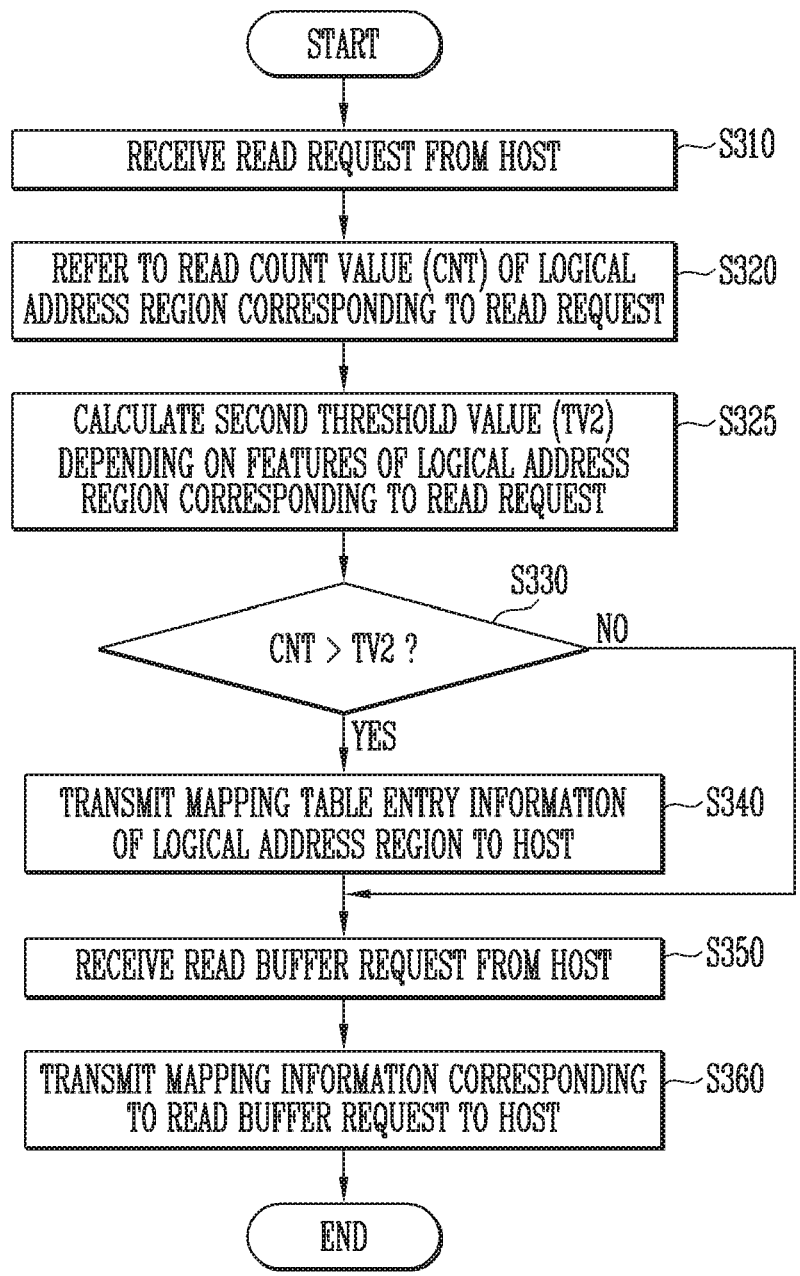
FIG. 13 is a flowchart illustrating a method of operating a controller according to an embodiment of the present disclosure.

FIG. 13 is a flowchart illustrating a method of operating a controller according to an embodiment of the present disclosure. At operation S310, the controller 200 of the storage device 1000 may receive a read request from the host 300. In performing this operation, mapping information may or may not be transmitted from the host 300. For example, when the corresponding mapping information is stored in the host memory 310, the mapping information may be transmitted, together with the read request, to the storage device 1000. When the corresponding mapping information is not stored in the host memory 310, the read request may be transmitted to the storage device 1000 without the mapping information being transmitted.

At operation S320, the controller 200 may refer to a read count value CNT of a logical address region corresponding to the received read request. The read count value CNT is referred to at operation S320 so as to perform a comparison with a first threshold value, which will be described later.

At operation S325, depending on the features of the logical address region corresponding to the read request, a second threshold value TV2 is calculated. When it is predicted that a data migration operation is to be internally performed in the storage device 1000 at some time in the future (e.g., within some predetermined time window in the near future), the second threshold value TV2 may be a value different from (e.g., greater than) the first threshold value TV1, as described above with reference to operation S130 of FIG. 10. When it is predicted that a data migration operation is not to be internally performed in the storage device 1000 at some time in the future (e.g., within the predetermined future time window), the second threshold value TV2 may be the same or substantially the same as the first threshold value TV1, as described above with reference to operation S130 of FIG. 10. Detailed embodiments of operation S325 will be described in detail later with reference to FIGS. 14 to 18.

At operation S330, a determination is made as to whether the read count value CNT is greater than the second threshold value TV2.

At operation S340, when the read count value CNT is greater than the second threshold value TV2, the controller 200 may transmit the mapping table entry information of the logical address region corresponding to the read request to the host 300. Also, at operation S340, the validity bitmap 211 may be checked and the mapping table entry information may be transmitted to the host 300 when the mapping information stored in the host memory 310 is invalid or when mapping information is not stored in the host memory 310. In one embodiment, the mapping table entry information may not be transmitted to the host 300 when the mapping information stored in the host memory is valid. The reason for this is that, when the mapping information is valid, there is no need to update the mapping information.

At operation S350, the controller 200 may receive a read buffer request from the host 300. The read buffer request may include a read buffer request corresponding to the mapping table entry information transmitted to the host 300, at operation S340.

At operation S360, the controller 200 may transmit the mapping information of an L2P group corresponding to the received read buffer request to the host 300.

Referring to FIGS. 10 and 13 together, in one embodiment operations S310, S320, S330, S340, S350, and S360 of FIG. 13 may be configured in substantially the same way as operations S110, S120, S130, S140, S150, and S160 of FIG. 10. For example, the method of FIG. 13 may be similar to that of FIG. 10, except that operation S325 is added. When it is predicted at operation S325 that a data migration operation is to be internally performed in the storage device 1000 within a future predetermined time window, the second threshold value TV2 may have a value different from (e.g., greater than) the first threshold value TV1, as described above with reference to operation S130 of FIG. 10. Accordingly, a time point at which the storage device 1000 will transmit "mapping table entry information" to the host 300 may be delayed.

Referring to FIG. 13, an embodiment is illustrated in which the read count value of the corresponding logical address region is referred to at operation S320. This operation is performed in response to operation S310 at which the read request is received from the host 300. The read count value is then compared with the second threshold value TV2 at operation S330 and the mapping table entry information is transmitted to the host 300 at operation S340. However, the operation of transmitting the mapping table entry information to the host 300 at operation S340 may also be performed regardless of the read request received from the host 300. For example, during an idle time of the storage device 1000, a logical address region having a read count value greater than the second threshold value TV2 may be selected from among all logical address regions, and mapping table entry information corresponding to the selected logical address region may be generated and transmitted to the host 300.

Figure 14:
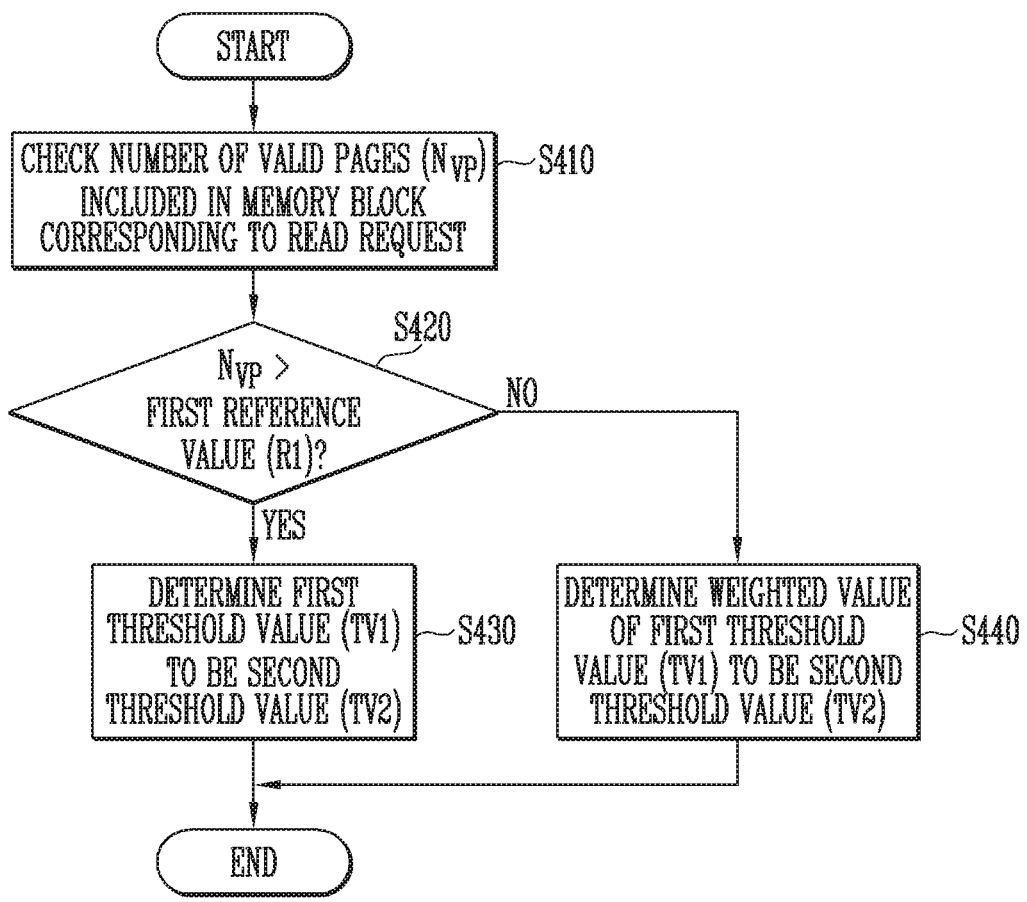
FIG. 14 is a flowchart illustrating an embodiment of operation S325 according to an embodiment.

FIG. 14 is a flowchart illustrating an embodiment of operation S325. Referring to FIG. 14, at operation S410, the number of valid pages $N_{VP}$ included in a memory block corresponding to the read request may be checked.

At operation S420, the number of valid pages $N_{VP}$ is compared to a first reference value R1. When the number of valid pages $N_{VP}$ is greater than the first reference value R1 (e.g., in case of "Yes"), the probability that the corresponding memory block is a victim block that is the target of a garbage collection operation in near time (e.g., in a predetermined future time window) is low. Accordingly, at operation S430, the first threshold value TV1 described at operation S130 of FIG. 10 may be determined to be the second threshold value TV2 that is a reference for the comparison at operation S330.

When the number of valid pages $N_{VP}$ is not greater than the first reference value R1 at operation S420 (e.g., in case of "No"), the probability that the corresponding memory block will be determined to be a victim block that is the target of the garbage collection operation in near time (e.g., in a predetermined future time window) is high. Accordingly, at operation S440, a weighted value of the first threshold value TV1 described at operation S130 of FIG. 10 may be determined to be the second threshold value TV2 that is the reference for the comparison at operation S330.

At operation S440, the second threshold value TV2 may be a value different from (e.g., greater than) the first threshold value TV1, and in an embodiment may be determined based on the first threshold value TV1. For example, at operation S440, the second threshold value TV2 may be determined based on Equation (1):

$$TV2=TV1+a1, \quad (1)$$

where a1 may be a natural number. Therefore, the second threshold value TV2 may be determined to be a value greater than the first threshold value TV1 in one embodiment. In other embodiments, the value of a1 may be set to a different value.

In other examples, at step S440, the second threshold value TV2 may be determined, as shown in the following Equation (2):

$$TV2=TV1+a2\cdot N_{IVP}, \quad (2)$$

where a2 may be a positive value and $N_{IVP}$ may be the number of invalid pages included in the memory block corresponding to the read request. Therefore, in one embodiment the second threshold value TV2 may be determined to be a value different from (e.g., greater than) the first threshold value TV1. In another embodiment, the value of a2 may be set to a different value.

Referring to FIG. 14, it can be seen that, when it is predicted that the memory block in which user data corresponding to the read request is stored is determined to be a victim block that is the target of a garbage collection operation in near time and that the corresponding user data will migrate to another memory block, a weighted value of the first threshold value is determined to be the second threshold value. Therefore, when it is predicted that a garbage collection operation will be performed on the memory block in which the user data corresponding to the read request is stored, a time point at which the storage device 1000 will transmit "mapping table entry information" to the host 300 may be delayed.

Figure 15:
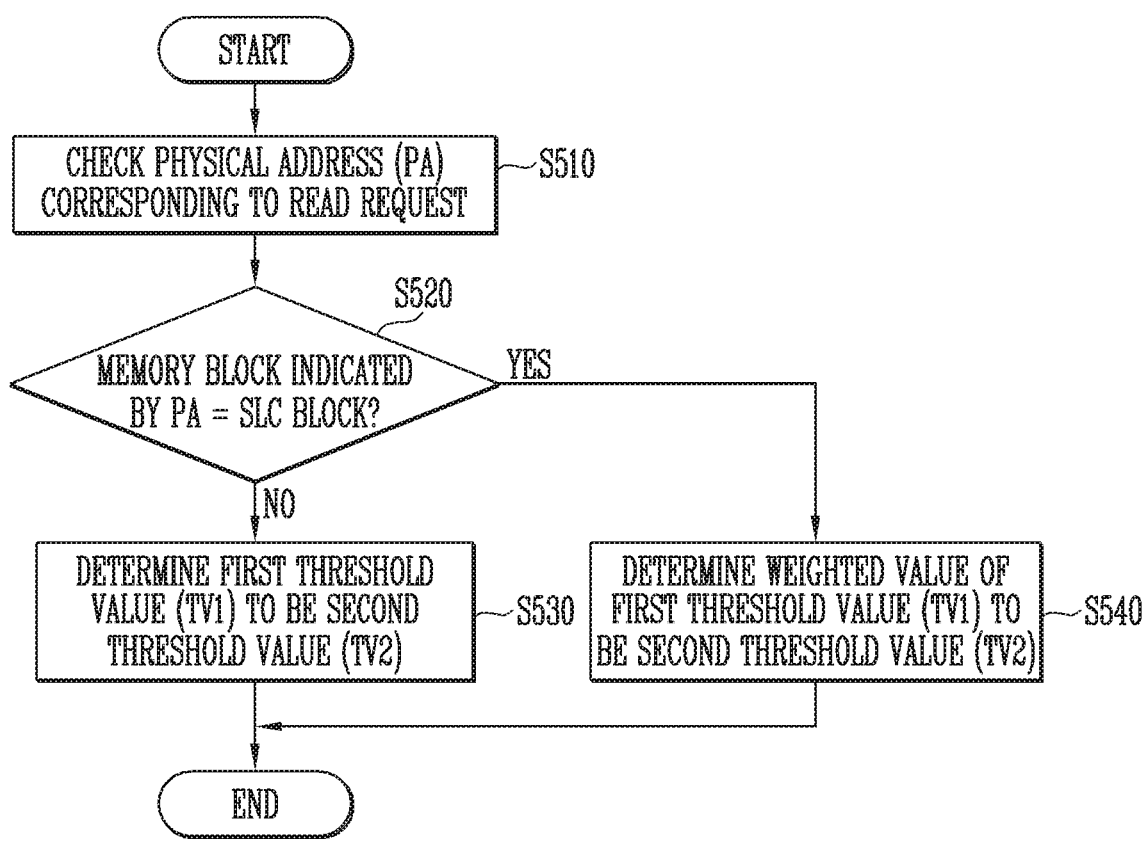
FIG. 15 is a flowchart illustrating an embodiment of operation S325 according to an embodiment.

FIG. 15 is a flowchart illustrating another embodiment of operation S325. Referring to FIG. 15, at operation S510, a physical address (PA) corresponding to the read request may be checked. The physical address (PA) corresponding to the read request may be checked with reference to mapping information cached in the device memory 210. When the physical address (PA) corresponding to the read request is not cached in the device memory 210, the corresponding mapping information may be read from the semiconductor memory device 100, and then the physical address (PA) may be checked.

At operation S520, a determination is made as to whether the memory block indicated by the physical address (PA) corresponding to the read request is a single-level cell (SLC).

At operation S530, when a memory block indicated by the physical address (PA) corresponding to the read request is not a single-level cell (SLC) (e.g., in case of "No"), the first threshold value TV1 may be determined to be the second threshold value TV2.

At operation S540, when a memory block indicated by the physical address (PA) corresponding to the read request is a single-level cell (SLC) (e.g., in case of "Yes"), the probability that the corresponding data will migrate to another block (e.g., an MLC block, a TLC block or a QLC block) may be determined to be relatively high. Accordingly, a weighted value of the first threshold value TV1 (described at operation S130 of FIG. 10) may be determined to be the second threshold value TV2 that serves as the reference for performing the comparison at operation S330.

At operation S540, the second threshold value TV2 may be a value different from (e.g., greater than) the first threshold value TV1 and may be determined based on the first threshold value TV1. For example, at operation S540, the second threshold value TV2 may be determined based on Equation (3):

$$TV2=TV1+a3, \quad (3)$$

where a3 may be a natural number. Therefore, in one embodiment the second threshold value TV2 may be determined to be a value greater than the first threshold value TV1. The value of a3 may be set to a different value in another embodiment.

In other examples, at operation S540, the second threshold value TV2 may be determined based on Equation (4):

$$TV2=a4\cdot TV1, \quad (4)$$

where a4 may be a value greater than 1. Therefore, the second threshold value TV2 may be determined to be a value different from (e.g., greater than) the first threshold value TV1. The value of a4 may be set to a different value in another embodiment.

Referring to FIG. 15, it can be seen that, when user data corresponding to the read request is currently stored in the SLC block and is predicted to migrate to another block (e.g., an MLC block, a TLC, or a QLC block), a weighted value of the first threshold value is determined to be the second threshold value. Therefore, when it is predicted that the user data corresponding to the read request migrates from the SLC block to another memory block, a time point at which the storage device 1000 will transmit "mapping table entry information" to the host 300 may be delayed.

Figure 16:
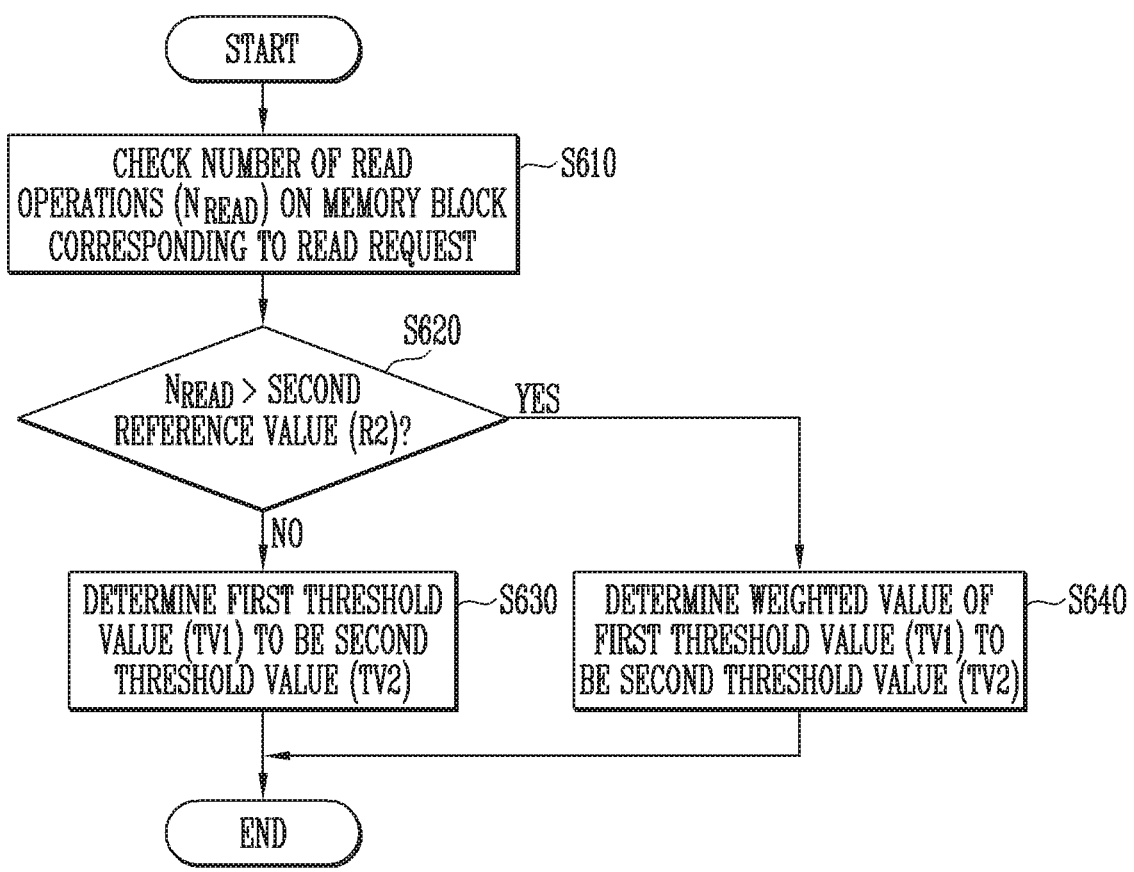
FIG. 16 is a flowchart illustrating an embodiment of operation S325 according to an embodiment.

FIG. 16 is a flowchart illustrating another embodiment of operation S325. Referring to FIG. 16, at operation S610, the number of read operations $N_{READ}$ performed on the memory block corresponding to the read request may be checked. The number of read operations $N_{READ}$ on the memory block may indicate, for example, the total number of read operations performed on the corresponding memory block from a time point at which data stored in the corresponding memory block is programmed to a current time point.

At operation S620, the number of read operations $N_{READ}$ is compared to the second reference value R2.

At operation S630, when the number of read operations $N_{READ}$ is not greater than the second reference value R2 (e.g., in the case of "No"), the probability that the corresponding memory block will be determined to be the target of a read reclaim operation in near time (e.g., a predetermined future time window) is relatively low. Accordingly, the first threshold value TV1 described at operation S130 of FIG. 10 may be determined to be the second threshold value TV2 that serves as a reference for the comparison at operation S330.

At operation S640, when the number of read operations $N_{READ}$ is greater than the second reference value R2 (e.g., in the case of "Yes"), the probability that the corresponding memory block will be determined to be the target of a read reclaim operation in near time (e.g., a predetermined future time window) is relatively high. Accordingly, a weighted value of the first threshold value TV1 described at operation S130 of FIG. 10 may be determined to be the second threshold value TV2 that serves as the reference for the comparison at operation S330.

At operation S640, the second threshold value TV2 may be a value different from (e.g., greater than) the first threshold value TV1 and may be determined, for example, based on the first threshold value TV1. In one embodiment, at operation S640, the second threshold value TV2 may be determined based on Equation (5):

$$TV2=TV1+a5, \qquad (5)$$

where a5 may be a natural number. Therefore, in this embodiment the second threshold value TV2 may be determined to be a value greater than the first threshold value TV1. The value of a5 may be set to a different value in another embodiment.

In another example, at operation S640, the second threshold value TV2 may be determined based on Equation (6):

$$TV2=a6 \cdot TV1 \qquad (6)$$

where a6 may be a value greater than 1. Therefore, in one embodiment the second threshold value TV2 may be determined to be a value different from (e.g., greater than) the first threshold value TV1. The value of a6 may be set to a different value in another embodiment.

Referring to FIG. 16, it can be seen that, when it is predicted that the memory block in which user data corresponding to the read request is stored is determined to be the target of a read reclaim operation in near time (e.g., a predetermined future time window) and that the corresponding user data will migrate to another memory block, a weighted value of the first threshold value may be determined to be the second threshold value. Therefore, when it is predicted that a read reclaim operation will be performed on the memory block in which the user data corresponding to the read request is stored, a time point at which the storage device 1000 will transmit "mapping table entry information" to the host 300 may be delayed.

Figure 17:
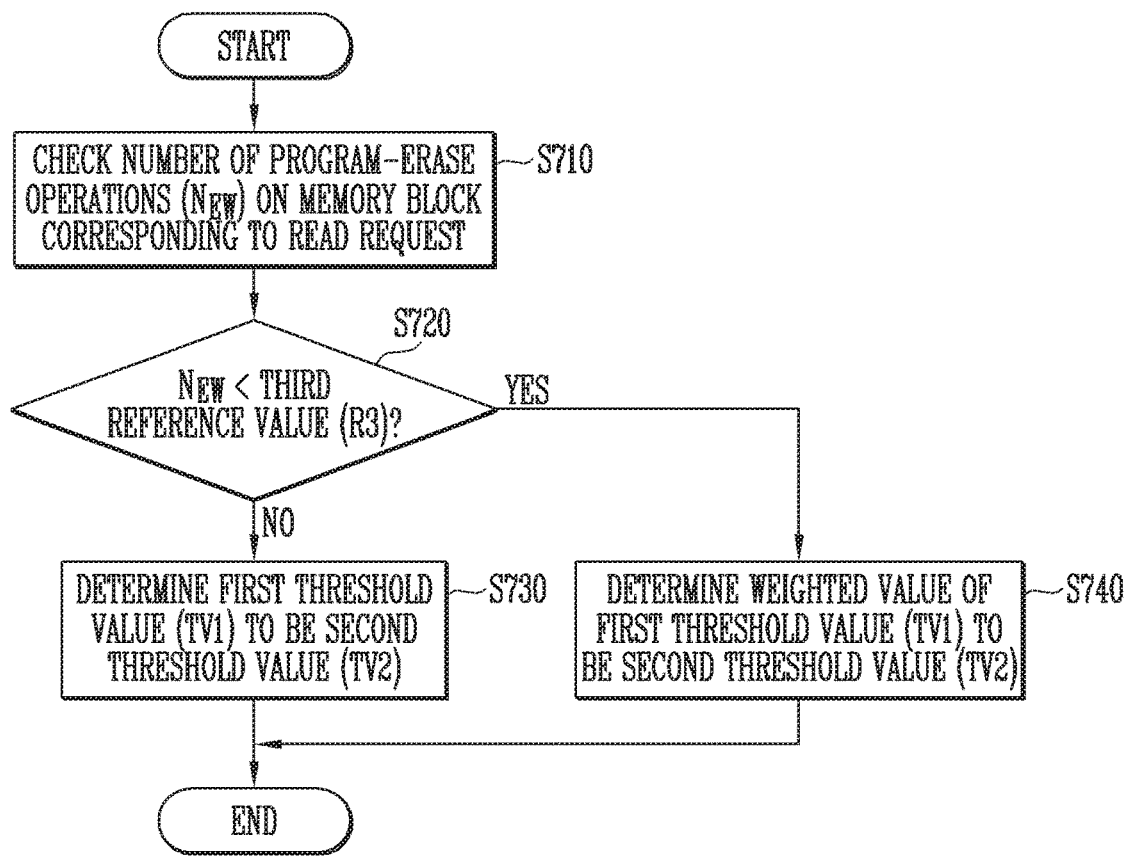
FIG. 17 is a flowchart illustrating an embodiment of operation S325 according to an embodiment.

FIG. 17 is a flowchart illustrating another embodiment of operation S325. Referring to FIG. 17, at operation S710, the number of program-erase operations $N_{EW}$ on the memory block corresponding to the read request may be checked. The number of program-erase operations $N_{EW}$ on the memory block may indicate the total number of program-erase cycles performed on the corresponding memory block up to a current time point since the production and shipping of the storage device 1000. For example, a program-erase operation may include a wear leveling operation. A wear leveling operation may be, for example, an operation of shifting data, stored in a memory block on which the number of erase operations is small, to another memory block in order to equalize the use frequencies of a plurality of memory blocks in the semiconductor memory device 100.

At operation S720, the number of program-erase operations $N_{EW}$ is compared to a third reference value R3.

At operation S730, when the number of program-erase operations $N_{EW}$ is not less than a third reference value R3 (in the case of "No"), the probability that the corresponding memory block will be determined to be the target of the wear leveling operation in near time (e.g., within a predetermined future time window) is relatively low. Accordingly, the first threshold value TV1, described at operation S130 of FIG. 10, may be determined to be the second threshold value TV2 that may serve as a reference for the comparison at operation S330.

At operation S740, when the number of program-erase operations $N_{EW}$ is less than the third reference value R3 (e.g., in the case of "Yes"), the probability that the corresponding memory block will be determined to be the target of the wear leveling operation in near time (e.g., a predetermined future time window) is relatively high. Accordingly, a weighted value of the first threshold value TV1 described at operation S130 of FIG. 10 may be determined to be the second threshold value TV2 that may serve as the reference for the comparison at operation S330.

At operation S740, the second threshold value TV2 may be a value different from (e.g., greater than) the first threshold value TV1 and may be determined, for example, based on the first threshold value TV1. In one embodiment, at operation S740, the second threshold value TV2 may be determined based on Equation (7):

$$TV2=TV1+a7, \qquad (7)$$

where a7 may be a natural number. Therefore, in one embodiment the second threshold value TV2 may be determined to be a value greater than the first threshold value TV1. The value of a7 may be set to a different value in another embodiment.

In another example, at operation S740, the second threshold value TV2 may be determined based on Equation (8):

$$TV2=a8 \cdot TV1, \qquad (8)$$

where a8 may be a value greater than 1. Therefore, the second threshold value TV2 may be determined to be a value different from (e.g., greater than) the first threshold value TV1. The value of a8 may be set to a different value in another embodiment.

Referring to FIG. 17, it can be seen that, when it is predicted that the memory block in which user data corresponding to the read request is stored will be determined to be the target of a wear leveling operation in near time (e.g., a predetermined future time window) and that the corresponding user data will migrate to another memory block, a weighted value of the first threshold value is determined to be the second threshold value. Therefore, when it is predicted that a wear leveling operation will be performed on the memory block in which the user data corresponding to the read request is stored, a time point at which the storage device 1000 will transmit "mapping table entry information" to the host 300 may be delayed.

Figure 18:
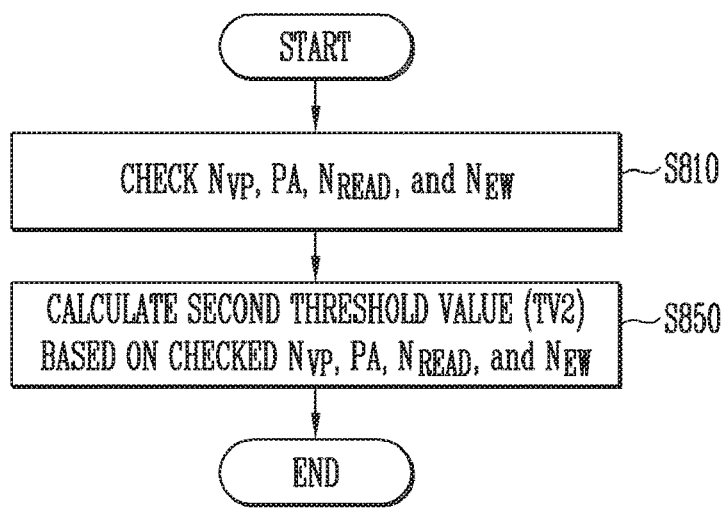
FIG. 18 is a flowchart illustrating an embodiment of operation S325 according to an embodiment.

FIG. 18 is a flowchart illustrating another embodiment of operation S325. Referring to FIG. 18, at operation S810, the following may be checked: the number of valid pages $N_{VP}$ included in a memory block corresponding to the read request, the physical address (PA) corresponding to the read request, the number of read operations $N_{READ}$ on the memory block corresponding to the read request, and the number of program-erase operations $N_{EW}$ on the memory block corresponding to the read request. At operation S820, the second threshold value TV2 may be calculated based on the checked values $N_{VP}$, PA, $N_{READ}$, and $N_{EW}$.

In an embodiment, the second threshold value TV2 may be determined based on Equation (9):

$$TV2=TV1+b1+b3+b5+b7, \qquad (9)$$

In Equation (9), when the number of valid pages $N_{VP}$ is greater than a first reference value R1, the value of b1 may be 0. In contrast, when the number of valid pages $N_{VP}$ is not greater than the first reference value R1, the value of b1 may be the value of a1, as described above with reference to FIG. 14 and Equation (1). In one embodiment, the value of b1 may be a value corresponding to a2·NIVP, as described above with reference to FIG. 14 and Equation (2).

In contrast, when the memory block indicated by the physical address (PA) is not an SLC block, the value of b3 may be 0. When the memory block indicated by the physical address (PA) is an SLC block, the value of b3 may be the value of a3, as described above with reference to FIG. 15.

When the number of read operations $N_{READ}$ is not greater than a second reference value R2, the value of b5 may be 0. When the number of read operations $N_{READ}$ is greater than the second reference value R2, the value of b5 may be the value of a5, as described above with reference to FIG. 16.

When the number of program-erase operations $N_{EW}$ is not less than a third reference value R3, the value of b7 may be 0. When the number of program-erase operations $N_{EW}$ is less than the third reference value R3, the value of b7 may be the value of a7, as described above with reference to FIG. 17.

In an example, the second threshold value TV2 may be determined based on Equation (10):

$$TV2=b2 \cdot b4 \cdot b6 \cdot b8 \cdot TV1, \qquad (10)$$

In Equation (10), when the number of valid pages $N_{VP}$ is greater than the first reference value R1, the value of b2 may be 1. In contrast, when the number of valid pages $N_{VP}$ is not greater than the first reference value R1, the value of b2 may be the value of a2·$N_{IVP}$, as described above with reference to FIG. 14.

In contrast, when the memory block indicated by the physical address (PA) is not an SLC block, the value of b4 may be 1. When the memory block indicated by the physical address (PA) is an SLC block, the value of b4 may be the value of a4, as described above with reference to FIG. 15.

When the number of read operations $N_{READ}$ is not greater than the second reference value R2, the value of b6 may be 1. When the number of read operations $N_{READ}$ is greater than the second reference value R2, the value of b6 may be the value of a6, as described above with reference to FIG. 16.

When the number of program-erase operations $N_{EW}$ is not less than a third reference value R3, the value of b8 may be 1. When the number of program-erase operations $N_{EW}$ is less than the third reference value R3, the value of b8 may be the value of a8, as described above with reference to FIG. 17.

Referring to FIG. 18, a value that is weighted using various methods may be determined to be the second threshold value TV2 depending, for example, on any of the following: the possibility of performing a garbage collection operation on a memory block in which data corresponding to the read request is stored, the possibility of the data migrating to another block other than an SLC block, the possibility of performing a read reclaim operation on the memory block, or the possibility of performing a wear leveling operation on the memory block.

Referring to FIG. 18, an embodiment is illustrated in which the second threshold value TV2 is calculated using all of the number of valid pages $N_{VP}$ included in a memory block corresponding to the read request, the physical address (PA) corresponding to the read request, the number of read operations $N_{READ}$ on the memory block corresponding to the read request, and the number of program-erase operations $N_{EW}$ on the memory block corresponding to the read request. However, this is merely exemplary, and it can be seen that in one embodiment the second threshold value TV2 may be calculated using at least two values selected from among $N_{VP}$, PA, $N_{READ}$, and $N_{EW}$.

Figure 19:
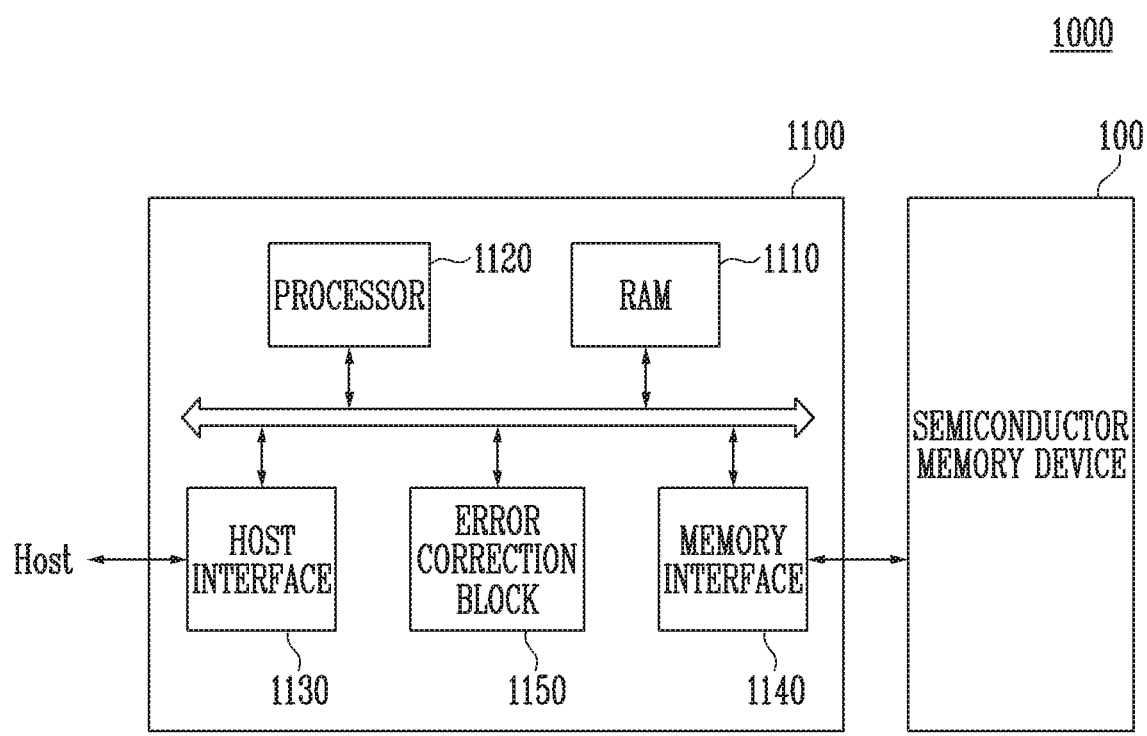
FIG. 19 is a block diagram illustrating a storage device having a semiconductor memory device and a controller according to an embodiment.

FIG. 19 is a block diagram illustrating an embodiment of a storage device 1000 having a semiconductor memory device and a controller. Referring to FIG. 19, the storage device 1000 includes a semiconductor memory device 100 and a controller 1100.

The semiconductor memory device 100 of FIG. 19 may have the same configuration and operation as the semiconductor memory device 100 described with reference to FIG. 2.

The controller 1100 is coupled to a host (Host) and the semiconductor memory device 100. The controller 1100 may access the semiconductor memory device 100 in response to a request from the host Host. For example, the controller 1100 may control read, program, erase, and background operations of the semiconductor memory device 100. The controller 1100 may provide an interface between the semiconductor memory device 100 and the host Host. The controller 1100 may run firmware for controlling the semiconductor memory device 100.

The controller 1100 includes a random access memory (RAM) 1110, a processor 1120, a host interface 1230, a memory interface 1240, and an error correction block 1150. The RAM 1110 may be used, for example, as any one of a working memory for the processor 1120, a cache memory between the semiconductor memory device 100 and the host, and a buffer memory between the semiconductor memory device 100 and the host.

The processor 1120 may control the overall operation of the controller 1100. The processor 1120 may control read, program, erase, and background operations of the semiconductor memory device 100. The processor 1120 may run firmware for controlling the semiconductor memory device 100. The processor 1120 may perform a function of a flash translation layer (FTL). The processor 1120 may translate a logical address (LA), provided by the host, into a physical address (PA) through the FTL. The FTL may receive the logical address (LA) and translate the LA into the physical address (PA) using a mapping table.

Examples of an address mapping method performed through the FTL may include various methods according to a mapping unit. Representative address mapping methods include a page mapping method, a block mapping method, and a hybrid mapping method. The size of the mapping block differs according to the type of a mapping system. Since the block mapping method provides mapping on a block basis, it requires a relatively small mapping table. However, when data of a page included in a specific memory block is updated, data of another page in the same memory block may also be copied to a new memory block. Accordingly, the performance of random writing is deteriorated. In contrast, the page mapping method may add all updated pages to a log block, and may maintain mapping information on a page basis. The hybrid mapping method may combine the page mapping method with the block mapping method and use the combined mapping method so as to improve random writing performance.

The processor 1120 may randomize data received from the host Host. For example, the processor 1120 may use a randomizing seed to randomize data received from the host Host. The randomized data may be provided, as data to be stored, to the semiconductor memory device 100 and then be programmed to the memory cell array.

The processor 1120 may derandomize data received from the semiconductor memory device 100 during a read operation. For example, the processor 1120 may use a derandomizing seed to derandomize data received from the semiconductor memory device 100. Derandomized data may be output to the host Host. In an embodiment, the processor 1120 may perform the randomizing and derandomizing operations by running software or firmware.

The host interface 1130 may include a protocol for performing data exchange between the host Host and the controller 1100. In an embodiment, the controller 1100 may communicate with the host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The memory interface 1140 may interface with the semiconductor memory device 100. For example, the memory interface 1140 includes a NAND interface or a NOR interface.

The error correction block 1150 may detect and correct errors in data received from the semiconductor memory device 100 using an error correction code (ECC). The error correction block 1150 may correct errors in read page data using an ECC. The error correction block 1150 may correct errors using a low density parity check (LDPC) code, a Bose, Chaudhri, Hocquenghem (BCH) Code, a turbo code, a Reed-Solomon code, a convolution code, a recursive systematic code (RSC), or coded modulation such as trellis-coded modulation (TCM), block coded modulation (BCM) or hamming code.

During a read operation, the error correction block 1150 may correct errors from read page data. When a number of error bits exceeding the number of correctable bits are included in the read page data, decoding may fail. When a number of error bits less than or equal to the number of correctable bits are included in the page data, decoding may succeed. A success in decoding indicates that the corresponding read command has passed. A failure in decoding indicates that the corresponding read command has failed. When decoding succeeds, the controller 1100 may output error-corrected page data to the host.

The controller 1100 and the semiconductor memory device 100 may be integrated into a single semiconductor device. In an embodiment, the controller 1100 and the semiconductor memory device 100 may be integrated into a single semiconductor device to form a memory card. For example, the controller 1100 and the semiconductor memory device 100 may be integrated into a single semiconductor device and form a memory card such as a personal computer memory card international association (PCMCIA), a compact flash card (CF), a smart media card (SMC), a memory stick multimedia card (MMC, RS-MMC, or MMCmicro), a SD card (SD, miniSD, microSD, or SDHC), or a universal flash storage (UFS).

The controller 1100 and the semiconductor memory device 100 may be integrated into a single semiconductor device to form a solid state drive (SSD). The SSD includes a storage device configured to store data in a semiconductor memory. When the storage device is used as the SSD, an operation speed of the host Host coupled to the storage device may be remarkably improved.

In an embodiment, the storage device 1000 may be provided as one of various elements of an electronic device such as a computer, a ultra mobile PC (UMPC), a workstation, a net-book, a personal digital assistants (PDA), a portable computer, a web tablet, a wireless phone, a mobile phone, a smart phone, an e-book, a portable multimedia player (PMP), a game console, a navigation device, a black box, a digital camera, a 3-dimensional (3D) television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, or one of various elements for forming a computing system.

In an embodiment, the semiconductor memory device 100 or the storage device 1000 may be mounted in various types of packages. For example, the semiconductor memory device 100 or the storage device 1000 may be packaged and mounted in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), or Wafer-Level Processed Stack Package (WSP).

Figure 20:
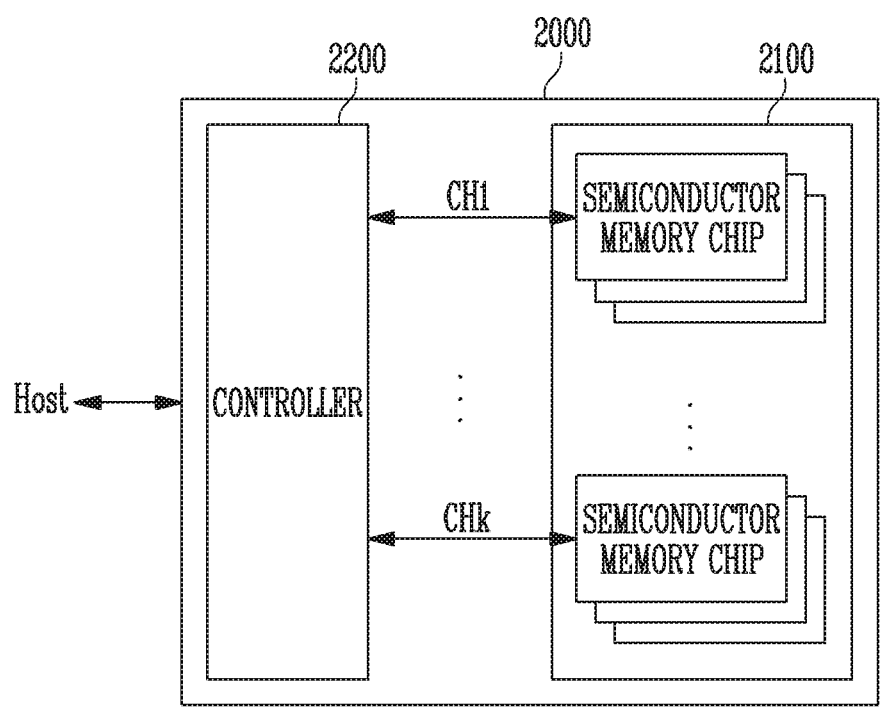
FIG. 20 is a block diagram illustrating an embodiment of a storage device of FIG. 19.

FIG. 20 is a block diagram illustrating an example of a storage device 2000 of FIG. 19. Referring to FIG. 20, the storage device 2000 includes a semiconductor memory device 2100 and a controller 2200. The semiconductor memory device 2100 may include a plurality of semiconductor memory chips. The semiconductor memory chips may be divided into a plurality of groups.

In FIG. 20, it is illustrated that the plurality of groups respectively communicate with the controller 2200 through first to k-th channels CH1 to CHk. Each semiconductor memory chip may have the same configuration and operation as the semiconductor memory device 100 described with reference to FIG. 2.

Each group may communicate with the controller 2200 through one common channel. The controller 2200 may control a plurality of memory chips of the semiconductor memory device 2100 through the plurality of channels CH1 to CHk.

In FIG. 20, a plurality of semiconductor memory chips has been described as being coupled to each channel. However, it will be understood that the storage device 2000 may be modified such that a single semiconductor memory chip is coupled to each channel.

Figure 21:
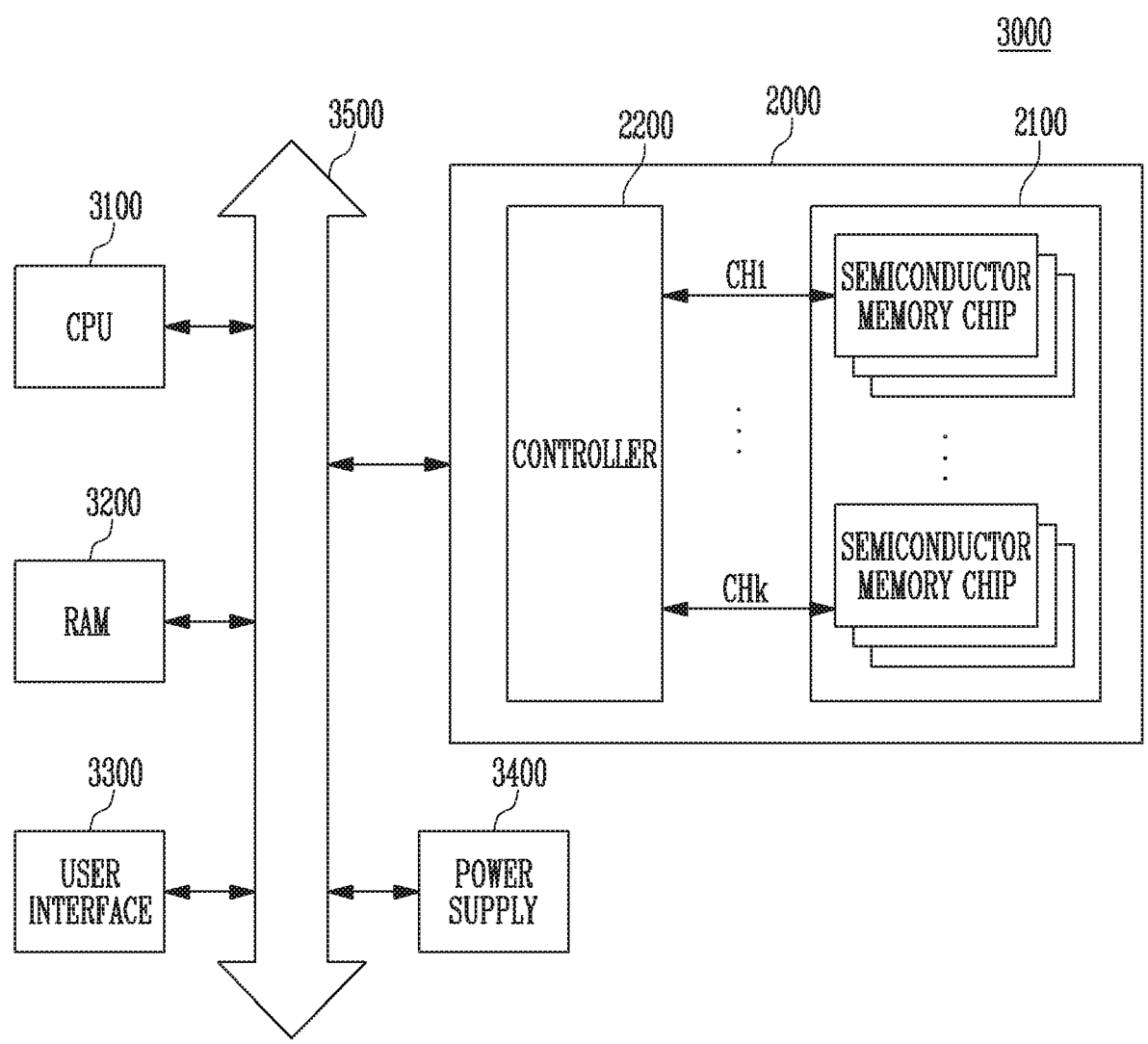
FIG. 21 is a block diagram illustrating an embodiment of a computing system having the storage device described with reference to FIG. 20.

FIG. 21 is a block diagram illustrating an embodiment of a computing system 3000 including the storage device described with reference to FIG. 20. Referring to FIG. 21, the computing system 3000 includes a central processing unit (CPU) 3100, a RAM 3200, a user interface 3300, a power supply 3400, a system bus 3500, and a storage device 2000.

The storage device 2000 is electrically coupled to the CPU 3100, the RAM 3200, the user interface 3300, and the power supply 3400 through the system bus 3500. Data provided through the user interface 3300 or processed by the CPU 3100 may be stored in the storage device 2000.

The host 300 illustrated in FIGS. 1 and 7 may be configured using components of the computing system 3000 except for the storage device 2000. For example, the host 300 may be configured using the CPU 3100, the RAM 3200, the user interface 3300, the power supply 3400, and the system bus 3500 which couples the components. In this case, the file system 320 may be implemented as a part of an operating system (OS) run by the CPU 3100. Further, the host memory 310 may be implemented as a part of the RAM 3200.

In FIG. 21, a semiconductor memory device 2100 is illustrated as being coupled to the system bus 3500 through the controller 2200. However, the semiconductor memory device 2100 may be directly coupled to the system bus 3500. Here, the function of the controller 2200 may be performed by the CPU 3100 and the RAM 3200.

In FIG. 21, the storage device 2000 described with reference to FIG. 20 is illustrated as being provided. However, the storage device 2000 may be replaced with the storage device 1000 described with reference to FIG. 19. In an embodiment, the computing system 3000 may include both the storage devices 1000 and 2000 described with reference to FIGS. 19 and 20.

The present disclosure may provide a host, a storage device, and a computing system having the host and the storage device, which can improve read performance.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not be always performed in regular order. Furthermore, the embodiments disclosed in the present specification and the drawings aim to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

What is claimed is:

1. A computing system, comprising:
a host including a host memory; and
a storage device including a processor, a semiconductor memory device configured to have a plurality of memory blocks and a device memory configured to cache mapping information of the semiconductor memory device, wherein the processor of the storage device is configured to transmit to the host in response to a read request from the host a) read data and b) mapping table entry information of a logical address region corresponding to the read data, wherein the mapping table entry information being transmitted to the host is based on features of the logical address region and identifies one or more pieces of mapping information cached in the storage device recommended to be stored in the host memory,
wherein the host is configured to transmit a read buffer request corresponding to the mapping table entry information to the storage device, wherein the storage device is configured to transmit mapping information corresponding to the read buffer request to the host, and
wherein the host is configured to store the mapping information in the host memory.

2. The computing system according to claim 1, wherein the processor of the storage device is configured to compare a read count value of a logical address region corresponding to the read request with a threshold value and to generate the mapping table entry information when the read count value is greater than the threshold value.

3. The computing system according to claim 2, wherein the processor of the storage device is configured to:
determine a first value to be the threshold value, when a number of valid pages included in a memory block corresponding to the read request is greater than a reference value, and
determine a second value greater than the first value to be the threshold value, when the number of valid pages included in the memory block corresponding to the read request is less than or equal to the reference value.

4. The computing system according to claim 3, wherein the second value is determined to be a value increased from the first value based on a number of invalid pages included in the memory block corresponding to the read request.

5. The computing system according to claim 2, wherein the processor of the storage device is configured to:
determine a first value to be the threshold value, when a memory block indicated by a physical address corresponding to the read request is not a single-level cell (SLC) block, and
determine a second value greater than the first value to be the threshold value, when the memory block indicated by the physical address corresponding to the read request is a single-level cell (SLC) block.

6. The computing system according to claim 2, wherein the processor of the storage device is configured to:
determine a first value to be the threshold value, when a number of read operations on a memory block corresponding to the read request is less than or equal to a reference value, and
determine a second value greater than the first value to be the threshold value, when the number of read operations on the memory block corresponding to the read request is greater than the reference value.

7. The computing system according to claim 2, wherein the processor of the storage device is configured to:
determine a first value to be the threshold value, when a number of program-erase operations on a memory block corresponding to the read request is equal to or greater than a reference value, and
determine a second value greater than the first value to be the threshold value, when the number of program-erase operations on the memory block corresponding to the read request is less than the reference value.

8. The computing system according to claim 2, wherein:
the device memory is configured to store a validity bitmap indicating validity of mapping information stored in the host memory, and the processor of the storage device is configured to transmit the generated mapping table entry information to the host when the mapping information of the logical address region corresponding to the read request is invalid with reference to the validity bitmap.

9. The computing system according to claim 2, wherein, the processor of the storage device is configured to transmit the generated mapping table entry information to the host when mapping information corresponding to the mapping table entry information is not stored in the host memory.

10. A storage device, comprising:
a semiconductor memory device including a plurality of memory blocks; and
a controller configured to control an operation of the semiconductor memory device, wherein the controller is configured to:
when a read request for user data is received from an external host, and valid mapping information is received together with the read request, generate a read command to control the semiconductor memory device so that the user data is read based on the mapping information, and
compare a read count value of a logical address region corresponding to the read request with a threshold value and generate mapping table entry information to be transmitted to the host, the mapping table entry information identifying which of the mapping information corresponding to the logical address region to be transmitted and stored in the host when the read count value is greater than the threshold value, the mapping table entry information identifying one or more pieces of mapping information cached in the storage device recommended to be stored in the host memory,
wherein the threshold value is determined based on features of the logical address region corresponding to the read request.

11. The storage device according to claim 10, wherein the controller is configured to:
determine a first value to be the threshold value, when a number of valid pages included in a memory block corresponding to the read request, among the plurality of memory blocks, is greater than a reference value, and
determine a second value greater than the first value to be the threshold value, when the number of valid pages included in the memory block corresponding to the read request is less than or equal to the reference value.

12. The storage device according to claim 11, wherein the second value is determined to be a value increased from the first value based on a number of invalid pages included in the memory block corresponding to the read request.

13. The storage device according to claim 10, wherein the controller is configured to:
determine a first value to be the threshold value, when a memory block indicated by a physical address corresponding to the read request is not a single-level cell (SLC) block, and
determine a second value greater than the first value to be the threshold value, when the memory block indicated by the physical address corresponding to the read request is a single-level cell (SLC) block.

14. The storage device according to claim 10, wherein the controller is configured to:
determine the first value to be the threshold value, when a number of read operations on a memory block corresponding to the read request, among the plurality of memory blocks, is less than or equal to a reference value, and
determine a second value greater than the first value to be the threshold value, when the number of read operations on the memory block corresponding to the read request is greater than the reference value.

15. The storage device according to claim 10, wherein the controller is configured to:
determine a first value to be the threshold value, when a number of program-erase operations on a memory block corresponding to the read request, among the plurality of memory blocks, is equal to or greater than a reference value, and
determine a second value greater than the first value to be the threshold value, when the number of program-erase operations on the memory block corresponding to the read request is less than the reference value.

16. A method of operating a storage device, the method comprising:
receiving a read request from a host;
referring to a read count value of a logical address region corresponding to the read request;
calculating a threshold value based on features of the logical address region corresponding to the read request;
comparing the read count value with the threshold value; and
generating mapping table entry information to be transmitted to the host, the mapping table entry information identifying which of the mapping information corresponding to the logical address region to be transmitted and stored in the host, when the read count value is greater than the threshold value, the mapping table entry information identifying one or more pieces of mapping information cached in the storage device recommended to be stored in the host memory.

17. The method according to claim 16, wherein calculating the threshold value based on the features of the logical address region corresponding to the read request comprises:
checking a number of valid pages included in a memory block corresponding to the read request; and
determining a second value that is a weighted value of a first value to be the threshold value, when the number of valid pages is not greater than a reference value,
wherein the second value is determined to be a value increased from the first value based on a number of invalid pages included in the memory block corresponding to the read request.

18. The method according to claim 16, wherein calculating the threshold value based on the features of the logical address region corresponding to the read request comprises:
checking a physical address corresponding to the read request; and
determining a second value that is a weighted value of a first value to be the threshold value, when a memory block indicated by a physical address corresponding to the read request is single-level cell (SLC) block.

19. The method according to claim 16, wherein calculating the threshold value based on the features of the logical address region corresponding to the read request comprises:
checking a number of read operations on a memory block corresponding to the read request; and
determining a second value that is a weighted value of a first value to be the threshold value, when the number of read operations on the memory block corresponding to the read request is greater than a reference value.

20. The method according to claim 16, wherein calculating the threshold value based on the features of the logical address region corresponding to the read request comprises:
 checking a number of program-erase operations on a memory block corresponding to the read request; and
 determining a second value that is a weighted value of a first value to be the threshold value, when the number of program-erase operations on the memory block corresponding to the read request is less than a reference value.

\* \* \* \* \*